United States Patent [19]

Surville

[11] Patent Number: 5,757,661
[45] Date of Patent: May 26, 1998

[54] GARMENT GRADING SYSTEM

[75] Inventor: Jean-Marc Surville, Talence, France

[73] Assignee: Lectra Systemes, Cestas, France

[21] Appl. No.: 571,965

[22] PCT Filed: Jul. 1, 1994

[86] PCT No.: PCT/FR94/00812

§ 371 Date: Mar. 11, 1996

§ 102(e) Date: Mar. 11, 1996

[87] PCT Pub. No.: WO95/01110

PCT Pub. Date: Jan. 12, 1995

[30] Foreign Application Priority Data

Jul. 2, 1993 [FR] France .................. 93 08118

[51] Int. Cl.$^6$ .................................................. G01B 5/004
[52] U.S. Cl. .............. 364/506; 364/470.02; 364/470.03; 364/470.04; 364/560; 395/904; 395/912; 395/50; 395/51
[58] Field of Search .............. 364/506, 560–562, 364/470.02, 470.06, 470.08; 395/904, 912, 10, 50, 20, 51, 60; 112/470.01, 470.04, 470.06; 33/17 R, 17 A, 12, 2 R

[56] References Cited

U.S. PATENT DOCUMENTS

| | | | |
|---|---|---|---|
| 3,391,392 | 7/1968 | Doyle | 364/470.02 |
| 4,677,564 | 6/1987 | Paly et al. | 364/470.05 |
| 5,355,444 | 10/1994 | Chirico | 395/912 |

FOREIGN PATENT DOCUMENTS

| | | |
|---|---|---|
| 338 964 | 10/1989 | European Pat. Off. |
| 2561801 | 9/1985 | France . |
| 26 56 997 | 7/1977 | Germany . |
| WO 89/08409 | 9/1989 | WIPO . |

OTHER PUBLICATIONS

D. Stein at al., "Expert System for the Design and Manufacture of Made–to–Measure Clothing", *Manufacturing Review*, vol. 4, No. 2, Jun. 1991, pp. 126–138.

Primary Examiner—Emanuel T. Voeltz
Assistant Examiner—Hal D. Wachsman
Attorney, Agent, or Firm—Bell Seltzer Intellectual Property Law Group of Alston & Bird LLP

[57] ABSTRACT

A computer system of the invention for grading includes means for automatically generating grading rules from a measurement scale. Advantageously, the system includes a database including one or more scales (50) of standard measurements for target populations for which clothes are to be made, and tools for enriching such a database with new measurement scales. The database also includes relations between the measurement scales and the knowledge relating to a specific garment that constitutes the taxonomy for that garment.

50 Claims, 12 Drawing Sheets

GARMENT GRADING SYSTEM

The present invention relates to a computer system for grading garments.

The quality and the value of a garment depend mainly on the cloth used and on the cut of the cloth. A garment constitutes a complex surface (two dimensions) that fits more or less closely around the volume (three dimensions) of the person to be clothed. The difficulty comes from the fact that initially each piece of a garment is a plane surface which must be adapted to variations in the volumes of individuals. In addition, ready-to-wear garments are in a style that may be or more less pronounced. A ready-to-wear garment thus manages to attenuate or hide imperfections in the anatomy of the wearer.

In conventional manner, when computed-aided design (CAD) is used for designing a new garment, a pattern is created for a given size, e.g. for [French] size "40" [approx US size "12"], i.e. the shapes of all the pieces of the new garment are determined for that particular size. Other sizes to be worn by members of a population are obtained by "grading" which consists in feeding the computer with grading rules for the garments, i.e. the way in which the coordinates of characteristic points of the garments, in particular peripheral points thereof, vary with size for each piece of the garment. Firstly, these grading rules are worked out on the basis of the empirical knowledge of the person doing the grading, i.e. the "grader". Secondly, there are numerous grading rules for various types of garment. The difficulty in applying such a method lies in choosing appropriate rules for properly chosen characteristic points of each piece of a garment and for a given starting size.

The grader interprets scales of measurements for various garment sizes and deduces therefrom which rule is to be applied to the various points of the garment piece being processed.

Establishing these grading rules and/or applying them to garments, therefore takes up a considerable amount of time during which the computer-assisted design station (which is an expensive resource in short supply) is otherwise unavailable.

In addition, it can happen that unsuccessful grading can cause sales of the garment to slump in the shops and/or cause a high rate of return from mail-order sales. Various solutions have therefore been proposed for automating garment grading. Firstly, it is known that the various desired sizes can be obtained by making the various pieces of the garment so they are geometrically similar. The multiplication coefficients for the various sizes are deduced from the scales of measurements.

Clearly, given that the envelope of human beings (the skin) does not vary in geometrically similar manner with size, that type of grading is only approximate. Thus, it can only apply to loose garments, for example sportswear or sweatshirts. Applying such grading to town clothes leads to poor results that are accepted only in countries where the population is not very demanding about the cut of clothes.

FR-A-2 561 801 describes a computer system for automatically grading garments by applying a coefficient that is equal to the product of a multiplication coefficient between the various garment sizes as calculated from a measurement scale, and a correction factor stored in an additional scale.

Systems have also been proposed in which a set of rules is worked out corresponding to various characteristic points of a garment, and each characteristic point of the garment is associated with the name of the corresponding rule. Computer systems use a one-to-one relationship between rule names and point names to apply the appropriate rule to each characteristic point of the garment.

That system gives satisfaction providing satisfactory rules are available for a garment. However, it provides the user with no help in creating the rules themselves nor in choosing a set of rules that is most appropriate for a garment. All it does, once the set of rules has been chosen, is to apply them automatically to the shape of the garment being processed.

Consequently, an object of the present invention is to provide a grading system that provides high quality grading.

Another object of the present invention is to offer a system that makes it possible to grade a large number of garment pieces quickly.

It is also an object of the present invention to offer a grading system that is easy to implement.

Another object of the present invention is to offer a grading system capable of adapting itself to a style of garment or to a new type of garment.

It is also an object of the present invention to offer a grading system suitable for adapting to the particular morphology of a given population.

It is also an object of the present invention to offer a system that enables reproducible grading to be performed.

It is also an object of the present invention to offer a grading system making it possible to conserve the style of a garment independently of its size.

It is also an object of the present invention to offer a system capable of guaranteeing consistency in a collection of garments.

It is also an object of the present invention to offer a grading system that is reliable, that does not run the risk of leading to a garment of poor quality.

It is also an object of the present invention to offer a system including a database containing knowledge about garments required for working out, selecting, and/or applying a grading rule.

It is also an object of the present invention to offer a computer grading system that does not require the grader to have computer knowledge.

It is also an object of the present invention to offer a grading system that makes it easier for the grader to understand the grading operations being performed.

It is also an object of the present invention to offer a grading system that makes it possible to display, e.g. on a monitor, the result of applying one or more rules to a garment.

According to the invention, these objects are achieved by a computer grading system including means for automatically generating grading rules from a scale of measurements. Advantageously, the system includes a database containing one or more scales of standard measurements of target populations for which garments are to be created, and tools for enriching such a database with new scales of measurements. The database also includes relations between the scales of measurements and knowledge relating to a specific garment, constituting the taxonomy of the garment.

Advantageously, on the basis of scales of anthropometric measurements, scales of measurement are worked out for clothes so that their values are spaced apart at regular intervals.

The invention mainly provides a computer system for grading garments, the system comprising a central unit, display means, input/output means, and memory means storing an operating system, the system being characterized in that the memory means additionally store, at least one measurement scale and at least one relation between the displacements of characteristic points on pieces of a garment and variations in measurements with the size of the garment, together with software for deducing grading rules therefrom.

The invention also provides a computer system for grading garments, characterized in that it includes means for applying the grading rules to various points of various pieces of the garment to be graded.

The invention also provides a computer system for grading garments, characterized in that the software is capable of applying the same relation between the displacements of characteristic points of pieces of a garment and variations in measurements with size, over a plurality of measurement scales so as to deduce therefrom a plurality of gradings for a garment.

The invention also provides a computer system, characterized in that grading software includes means for creating new relations between the displacements of characteristic points of pieces of a garment and variations in measurements with size.

The invention also provides a computer system, characterized in that it includes a database storing at least one scale of measurements and at least one relation between displacements of characteristic points of the pieces of a garment and variations of the measurements with size.

The invention also provides a computer system, characterized in that the points used as characteristic points for pieces of a garment are points that ought to face measurement points in a measurement table.

The invention also provides a computer system, characterized in that the relations between the displacements of the characteristic points of a piece of a garment and variations in measurements with size of the garment include information concerning size percentage variation to be applied to each characteristic point of each piece of the garment.

The invention also provides a computer system, characterized in that the relations between the characteristic displacements of pieces of a garment and variations in measurement with size of the garment include information concerning the orientation to be given to the displacements of the characteristic points.

The invention also provides a computer system, characterized in that it includes an interface, in particular a graphics interface, including menus for dialog with a grader.

The invention also provides a computer system, characterized in that it includes means for displaying icons on a graphics screen representing the data required for processing (sector of activity, measurements, garment types, . . . ), means enabling the operator to point at the various graphics elements displayed, and means for interpreting such pointing as instructions or commands to the computer system.

The invention also provides a computer system, characterized in that it includes a menu giving the grader a selection of relations to implement between the displacements of the characteristic points of the pieces of a garment and the variations of measurements with size available in the system.

The invention also provides a computer system, characterized in that it includes a menu giving the grader a selection of measurement scales to implement.

The invention also provides a computer system, characterized in that it includes means for graphically displaying the result of grading.

The invention also provides a computer system, characterized in that the central unit is a graphics station for computer-assisted garment design.

The invention also provides a computer system for grading garments, characterized in that it includes means for modifying a measurement scale in such a manner as to distribute variations in at least one measurement uniformly over consecutive sizes, at least over a range of sizes covering at least three consecutive sizes.

The invention also provides a computer system for grading, characterized in that the storage means store tolerances that are acceptable when modifying the measurement scale and in that it includes means for preventing any modification that lies outside said acceptable tolerances.

The invention also provides a computer system, characterized in that it includes means for modifying the relations between the displacements of the characteristic points of the garment pieces and the measurement variations with size of the garment, in particular for modifying the displacement percentages allocated to the various characteristic points.

The invention also provides a computer system, characterized in that it includes means for allocating a rule to each characteristic point of the garment to be graded, which rule has the same name as the name allocated to said characteristic point.

The invention also provides a computer system, characterized in that it includes means, in particular an expert system, for recognizing the locations of various characteristic points on the various pieces of the garment and for allocating corresponding names thereto.

The invention also provides a computer system for grading garments, characterized in that it includes means for working out grading rules directly on the pieces of a garment, in that a characteristic point of one piece of the garment may be subjected to a plurality of displacements, and in that it includes means for determining the displacement that is the resultant of said plurality of displacements.

The invention also provides a computer system for grading garments, characterized in that it includes an expert system including a knowledge base in which there are stored relations between the displacements of the characteristic points of the pieces of a garment and variations in measurements with size for the garment.

The invention also provides a computer system for grading garments, characterized in that it includes an expert system for ensuring a uniform distribution of the intervals between the various sizes in a scale, and in that the expert system proposes to the grader an optimum scale that has been made uniform.

The invention also provides a computer system for grading garments, characterized in that when the scale to be used for grading does not include certain relevant measurements, the expert system determines them on the basis of other measurements available in the same scale.

The invention also provides a computer system for grading garments, characterized in that it includes an expert system that recognizes that the characteristic points of a garment to be graded.

The invention also provides a computer system, characterized in that the expert system includes a base comprising relations between the displacements of the characteristic points of the pieces of a garment and variations of measurements with size of the garment, and in that it deduces therefrom grading rules to be applied to the various characteristic points of the garment to be graded, and in that it applies the grading rules to the recognized characteristic points.

The invention also provides a method of grading garments implementing a computer system of the invention, characterized in that it comprises the steps consisting in:

a) loading the central memory of the computer with a description of the shapes of the various pieces of a garment to be graded, a measurement scale, and a relation between the displacements of the characteristic points of the pieces of the garment to be graded and measurement variations with size of the garment;

b) computing the intervals between the measurements of consecutive sizes for the garment;

c) deducing from the relation between the displacements of the characteristic points of the pieces of a garment and variations in measurements with size and in the measurement scale, grading rules to be applied to the various characteristic points of the various pieces of the garment to be graded;

d) applying the grading rules determined in step c) to the various corresponding characteristic points of the garment; and e) storing the resulting grading in a mass memory and/or in a database.

BRIEF DESCRIPTION OF THE DRAWINGS

The invention will be better understood from reading the following description and the accompanying figures given as non-limiting examples, and in which:

In FIGS. 1 to 14, the same references are used to designate the same elements.

In FIG. 1, there can be seen the edge 1 of a garment piece corresponding to a given size, e.g. size "40". To make garments in other sizes, the way in which characteristic points, e.g. points P1 to P6 in FIG. 1, vary with size is determined. Variation with size for point P3 is shown at 2 while variation for point P4 is shown at 3. In ready-to-wear clothing, size varies discontinuously. Thus, variations 2 and 3 have graduations corresponding, for example, to the positions of points for sizes "48", "46", "44", "42", "40", "38", and "36"; the edge of the garment piece for size "44" is given reference 4 in FIG. 1.

In the grading software of known types of computer-assisted design system, the grader selects from the grading rules available in the software those which appear to be best suited to the type of garment and to the starting size. This selection is very empirical. The grader relies on experience, which can lead to excellent results with highly-qualified personnel. A less experienced grader applies the ready-made rules that can be found in works that teach grading, or selects in approximate manner a grading rule available in the computer-assisted design system, and that can lead to catastrophic results which need to be corrected by grading again, or to mediocre results that compromise the commercial success of the garment.

Figure 1:
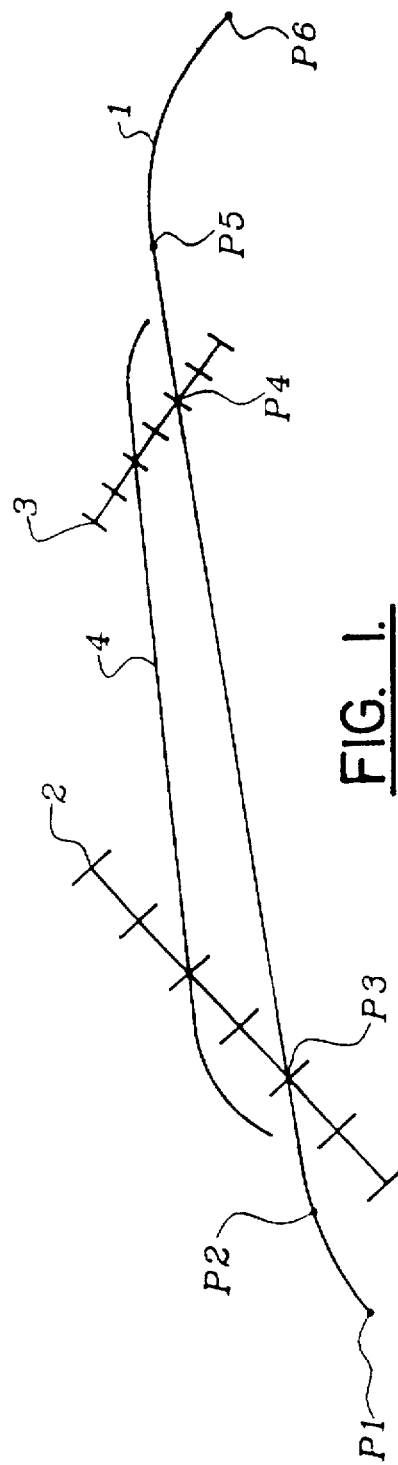
FIG. 1 is a diagram explaining the principle of grading.
Figure 2:
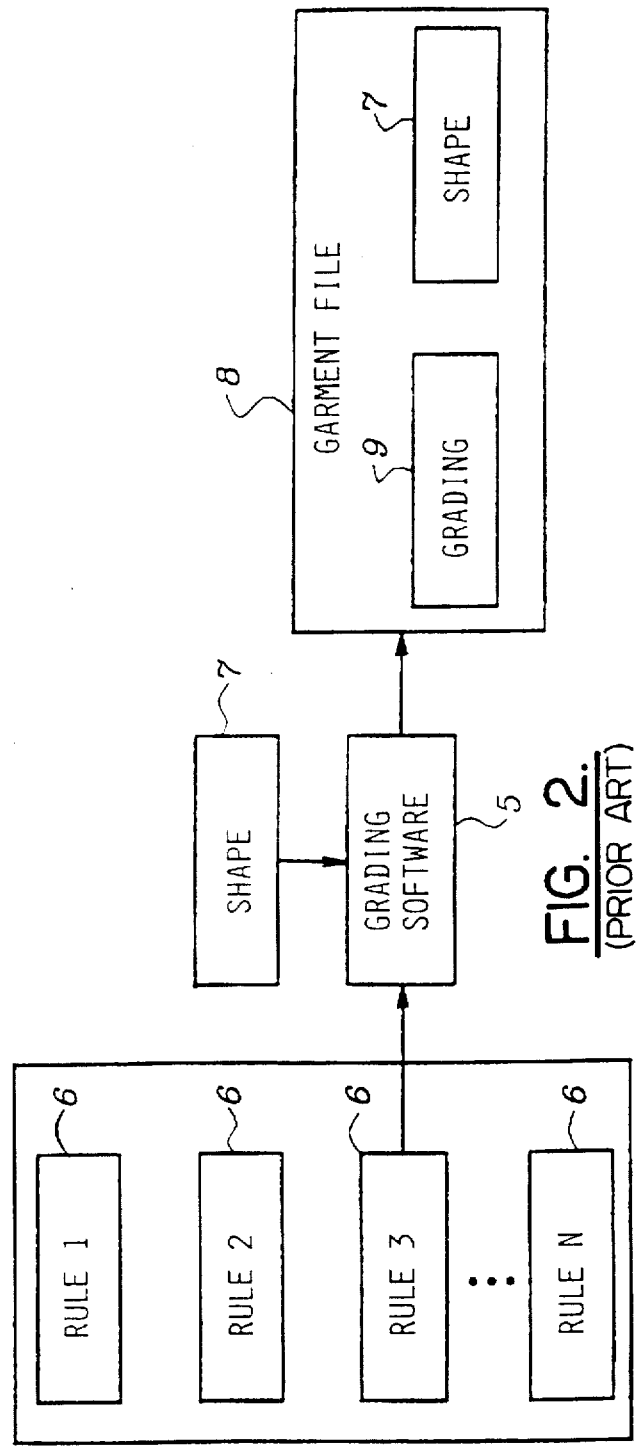
FIG. 2 is a first block diagram of a computer system of known type.

FIG. 2 shows a first way in which a known type of computer grading system operates. By way of example, the system comprises a graphics workstation provided with simple grading software 5. It is common practice to use a graphics station of the same type as that used for computer-assisted design of garments.

A certain set of garment grading rules 6 is stored in the memory device of the graphics station, typically a hard disk. After loading the grading software 5, the grader loads into the memory the shape 7 of a piece of a garment, e.g. the front of a jacket, taken from the mass memory of the graphics station or from a database connected to a computer network. The grader allocates a grading rule to each characteristic point of the shape 7 being processed, i.e. a rule specifying the increments to which the point must be subjected as a function of the size of the garment. Rules are applied to each of the characteristic points of each piece of the garment. The grading software 5 of known type incorporates no knowledge about the garment being processed. In the best of circumstances, this knowledge is thoroughly mastered by the grader. The grader then applies the appropriate rule to each point by means of the grading software. However, garment consistency is never guaranteed. It can happen that the grader does not take sufficient account of the grading rules applied to the front of the jacket when dealing with the back of the same jacket. In which case, change in size is badly distributed between the front and the back. An inexperienced grader may choose a rule that is inappropriate to the point being processed for the type of garment. In any event, grading is a lengthy operation since the grader must apply a rule individually to each point.

Figure 3:
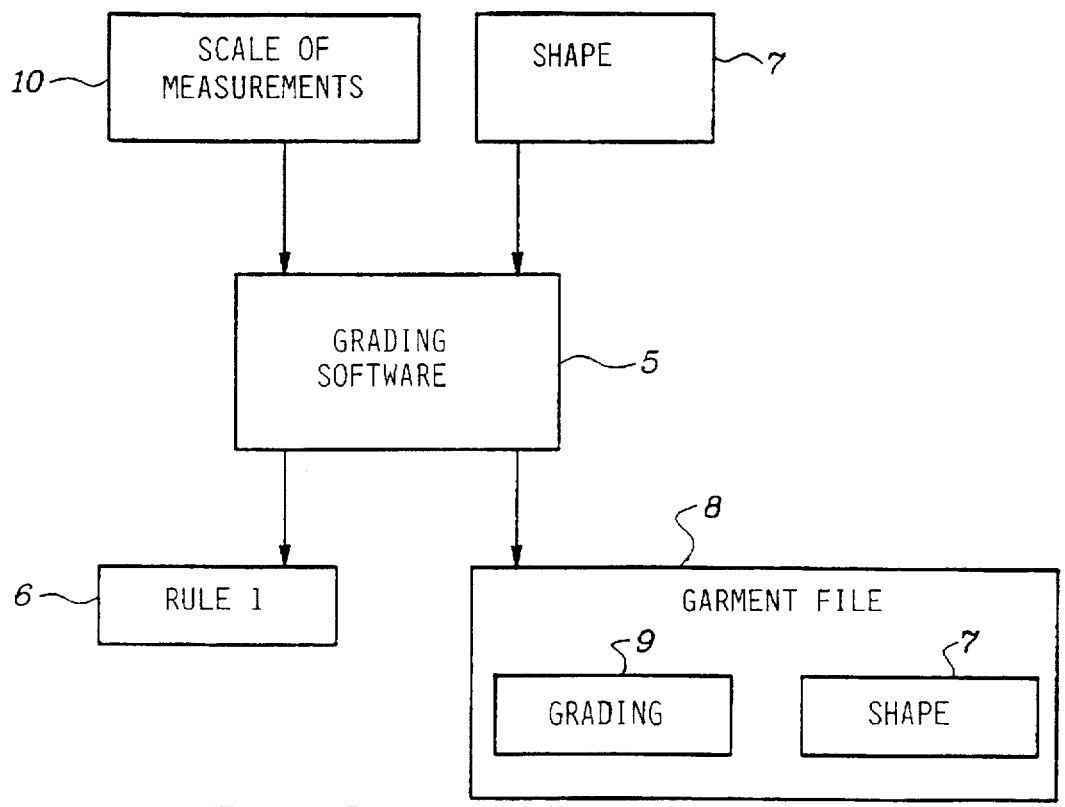
FIG. 3 is a second block diagram of a computer system of known type.

With the computer system of known type, the experienced grader can generate new grading rules corresponding, for example, to a new style or to a new type of garment piece, with this being done as shown in FIG. 3. The grader uses a scale of measurements 10 which is either given on a paper document or else stored in the memory of the grader (i.e. a physical person), or else in the best circumstances is already stored in the memory of the graphics workstation. Using the grading software 5, and based on the scale of measurements 10, the grader determines the increments to be applied for the various sizes to the various characteristic points of a garment. Each new rule 6 comprises a set of increments for a characteristic point for all of the sizes. The rule is firstly memorized as such in the mass memory of the computer, and secondly it participates in the grading 9 of the garment file 8.

Since the grading software 5 of known type has no knowledge about clothes, it is the grader who establishes relations between the increments of the rule and standardized sizes. In addition, it should be observed that the newly created rule 6 is derived from a single table of measurements 10.

Figure 4:
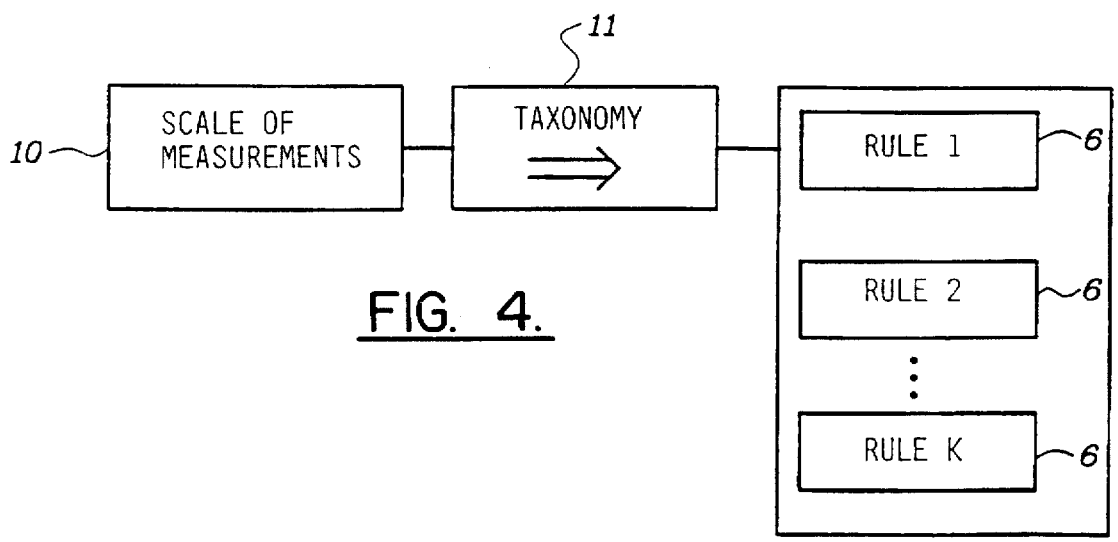
FIG. 4 is a block diagram of an embodiment of a system of the present invention.

To remedy these drawbacks, and as shown in FIG. 4, the grading software uses and processes scales and taxonomies.

a) Scales: starting from a statistical study on the measurements of a target population, various types of scales are drawn up which constitute tools making it possible to offer a particular kind of garment in various sizes. Taxonomy specifies how increments (changes in measurement) should be distributed amongst the various points of the garment. Several types of scale exist. An anthropometric scale comprises averages of raw data taken from a sample of individuals. These averages do not have scatter.

Certain measurements of an anthropometric scale can be processed to make them more suitable for making up garments (and not for individuals) thus enabling scales of sizes to be constructed.

A garment scale contains information required for making up a type of garment. In addition to detailed information concerning pertinent measurements taken from a scale of sizes, garment scales include additional information, e.g. the length of the finished garment, the length of its sleeves, etc.

. . .

The system of the invention advantageously includes a module for processing scales to make the distribution of intervals between the various sizes more uniform. The intervals between the various sizes in a scale to be treated are distributed regularly starting from a central size, e.g. size "40", with this being done for the measurement(s) pertinent to the grading that is to be performed. A regular interval is adopted for all sizes or for a range of sizes, with extreme sizes, for example, corresponding to different intervals.

An example of the information that may be taken from a scale of sizes is given in Table 1.

TABLE I

| Size | Hip Measurement | Interval |
| --- | --- | --- |
| 36 | 91 | — |
| 38 | 95.5 | 4.5 |
| 40 | 98 | 2.5 |
| 42 | 102.5 | 4.5 |
| 44 | 107 | 4.5 |

TABLE II

| Size | Hip Measurement | Interval |
| --- | --- | --- |
| 36 | 90 | — |
| 38 | 94 | 4 |
| 40 | 98 | 4 |
| 42 | 102 | 4 |
| 44 | 106 | 4 |

Table 2 gives a first example of processing the scale of Table 1 in which the average value of the intervals (4 cm) is adopted in Table 2, starting from the central size "40".

Advantageously, the system of the present invention includes values of tolerances acceptable during such processing. For example, tolerance values will be considerably smaller when the size of the garment is being reduced as opposed to being increased. Thus, the hip measurement of 94 for size 38 is 1.5 cm smaller than the value given in Table 1. This value may be rejected by the system as being unacceptable. In which case, a constant interval is adopted over one or more ranges of the scale of measurements or some other method of making the intervals regular is adopted. For example, the median, the weighted median, or the arithmetic average of the intervals in Table 1 may be used. For example, in Table 3, the most commonly encountered value of 4.5 cm is adopted as the value for the interval.

Table 3 starts from a hip measurement of 98 for a size "40".

TABLE III

| Size | Hip Measurement | Interval |
| --- | --- | --- |
| 36 | 89 | — |
| 38 | 93.5 | 4.5 |
| 40 | 98 | 4.5 |
| 42 | 102.5 | 4.5 |
| 44 | 107 | 4.5 |

In Table 4, the same value has been retained for the interval (4.5 cm) but starting from a hip measurement of 91 for a size "36".

TABLE IV

| Size | Hip Measurement | Interval |
| --- | --- | --- |
| 36 | 91 | — |
| 38 | 95.5 | 4.5 |
| 40 | 100 | 4.5 |
| 42 | 104.5 | 4.5 |
| 44 | 109 | 4.5 |

In Table 5, the same hip measurement is used for size "36", but now the interval is 4 cm.

TABLE V

| Size | Hip Measurement | Interval |
| --- | --- | --- |
| 36 | 91 | — |
| 38 | 95 | 4 |
| 40 | 99 | 4 |
| 42 | 103 | 4 |
| 44 | 107 | 4 |

In Table 6, there can be seen a scale which has been made regular in application of the invention for women's skirts, the first three lines relate to anthropometric measurements such as waist measurement, hip measurement, and vertical distance (drop) between them, while the fourth line gives the total length of the garment. All of the measurements are given in centimeters. The total length of the skirt varies by 1 centimeter between two standardized sizes.

TABLE 6

POPULATION: France SECTOR: Women GARMENT TYPE: Skirt

| measurement | source | sizes | | | | |
| --- | --- | --- | --- | --- | --- | --- |
| | | 36 | 38 | 40 | 42 | 44 |
| waist | anthro. | 66 | 70 | 74 | 78 | 82 |
| hip | anthro. | 91 | 95 | 98 | 102 | 107 |
| drop | anthro. | 19 | 19.3 | 19.6 | 20 | 20.4 |
| total length | garment | 59 | 60 | 61 | 62 | 62 |

Naturally processing a plurality of intervals in the same scale does not go beyond the ambit of the present invention. Similarly, a given scale can be made regular in different ways for various types of garment. The tolerance is not the same for a pair of trousers as for a skirt. Regular variation in dimensions between two sizes of a garment facilitates grading, makes it possible to retain the same style for the garment, facilitates checking pieces during cutting, while nevertheless providing garments that fit the majority of the target population well.

Naturally a scale that has been regularized for one type of garment can be saved for use in grading a garment of the same type for the same target population.

In a first variant, the operator tells the computer system of the invention which interval or intervals are to be regularized, e.g. hip measurement, and bust measurement, with the system displaying the results, e.g. in the form of a table, and with the system drawing the operator's attention to values that are not within tolerance, e.g. by displaying them in red or flashing. In a variant, the system does not display values of intervals lying outside the acceptable tolerances. Advantageously, a request to regularize scales is input graphically. For example, the interval(s) to be regularized is/are selected using a pointing tool on an icon representing the garment, the base size and the extents of the various ranges being given in a table that summarizes the scales to be processed.

In an advantageous variant, the computer system of the present invention computes all possible regularizations on a measurement scale to be processed, and discards regularized intervals that do not satisfy the tolerances chosen by the operator, classifying the resulting scales as a function of the quality of the grading they can obtain. Regularized intervals are computed for all of the relevant measurements for a garment that is to be graded over all possible combinations of interval ranges, by successively taking each of the sizes in the scale as the base size from which to perform regularization. The proposing and the classifying of various resulting regularized scales are advantageously handled by an expert system, possibly after rejection of regularized scales that do not satisfy the required tolerances. The expert system includes a knowledge base incorporating knowledge of an expert in clothes making, and in particular knowledge of a grader, concerning how garments should be graded. In conventional manner the knowledge base comprises a fact base and a rule base. The rule base comprises rules of the type: let:

Ideal interval=(sum of intervals between sizes)/(number of sizes−1)

Real measurement: measurement from scale.

The rank of a size is the consecutive size number separating a given size from the reference size; sizes smaller than the reference size are given a minus sign. For example, if the reference size is 40, then sizes are given the following ranks:

size 36: rank −2 size 38: rank −1 size 40: rank 0 size 42: rank 1 and size 44: size 2.

A computed measurement is equal to the measurement of the reference size plus the product of the rank of the size multiplied by the ideal interval.

Rule 1:

If (real measurement−computed measurement) >tolerance, then break-off size.

Rule 2:

Break-off sizes constitute the limits for ranges of sizes to be made more uniform.

Rule 3:

If break-off sizes are at the ends of the measurement scale, then favor a range of central uniform intervals that is as long as possible.

Rule 4:

If there is a break-off size in the middle portion of the measurement scale, then favor scales that include two long ranges with uniform intervals.

In a first variant, the computer system of the present invention presents the grader with the garment scale as optimized by the system, for validation purposes, i.e. the expert system presents the regularized garment scale that it considers as being optimum. The grader may possibly choose between the three best regularized garment scales, for example. In a variant, scale regularization is an operation that is transparent for the grader, with the system optimizing the garment scale prior to the grading step.

Optimization of the garment scale may take account of knowledge about the type of garment to be graded as contained in the taxonomy, e.g. acceptable tolerances may be included in the taxonomy. For example, for a garment that is supposed to make the wearer look slimmer, the taxonomy will include small tolerances on those measurements that are in danger of making the wearer look plumper.

When it is desired to avoid regularizing the scale over ranges, it may be advantageous to simplify the scale, e.g. by rounding the intervals between the various measurements to whole numbers.

b) Taxonomies: the grading software of the present invention uses modules 11 that incorporate knowledge about a type of garment. These modules are referred to herein as "taxonomies". The taxonomies 11 enable a measurement table 10 stored in the memory of the graphics workstation or in a database of a computer network to be connected with a set of grading rules 6 for various characteristic points of the garment. A taxonomy 11 is thus independent of the measurement table and it makes it possible automatically to generate grading rules on the basis of a different measurement scale, for example a scale applying to a different population. One example of a taxonomy 11 holds the following knowledge about a garment:

name of garment type;

name and general configuration of the various pieces of the garment;

characteristic points of the garment related to points that determine the measurements of the person to be clothed; and the distribution for each measurement of the intervals between sizes, over the various pieces of the garment, and the orientation of each point of said variation.

Figure 14:
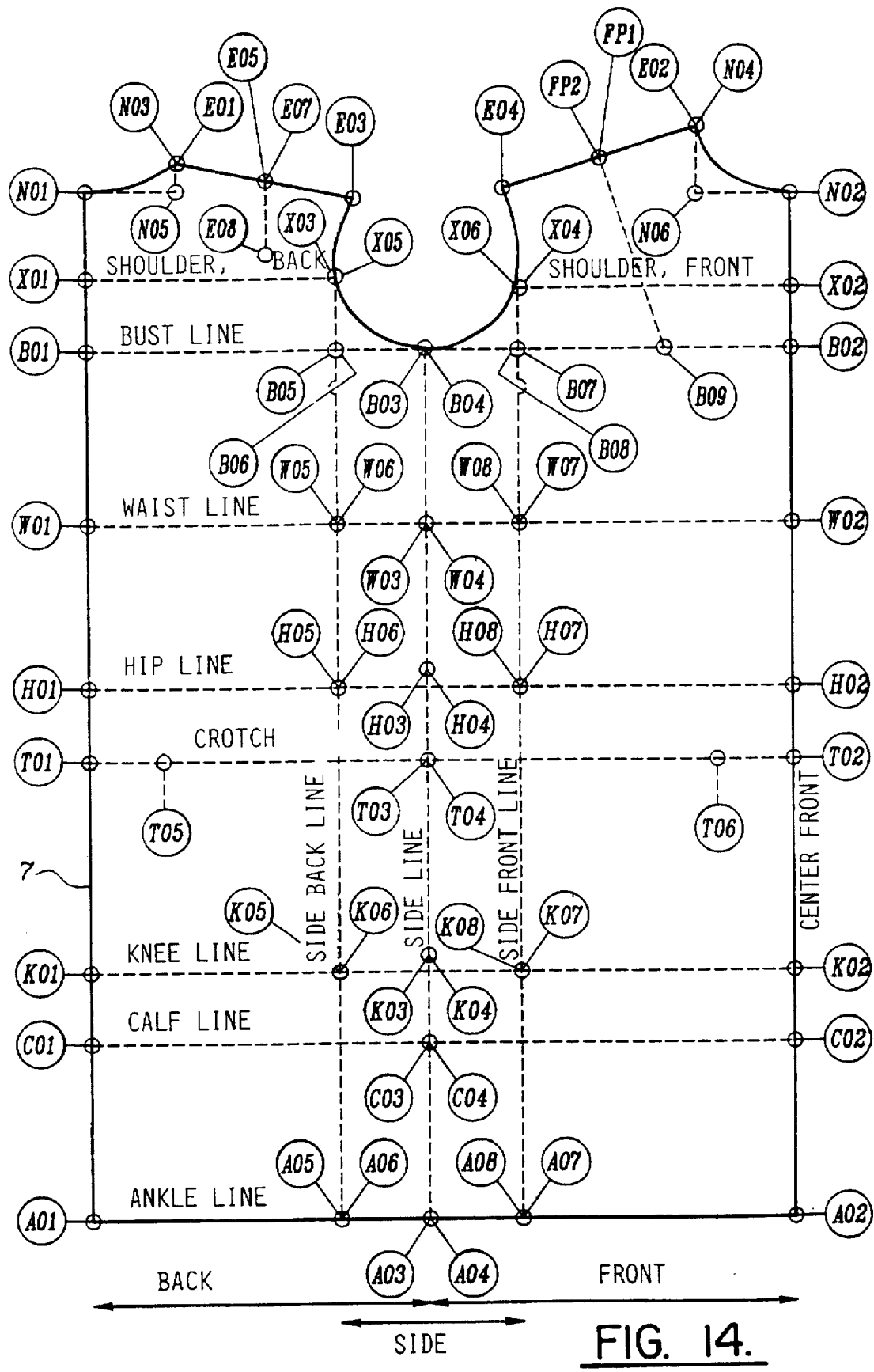
FIG. 14 is a diagram explaining how various absolute points are allocated to pieces for all types of garment.

Advantageously, the characteristic points used are points that need to correspond with characteristic measurement points of a measurement table. Such characteristic points are referred to as "absolute" points in that they are defined uniquely regardless of the type of garment. For example, the front point related to the bust measurement is the same for a jacket, a blouse, or a coat (FIG. 14).

Advantageously, a mnemonic name is given to each absolute point of the garment. Each name may comprise, for example, the first letter of the name in English of the line on which it is located followed by a two-digit number.

When a new type of garment or a new style of garment is created, it may be necessary to create a new taxonomy 11. This new taxonomy may be created ex nihilo, which operation is normally performed by the designer of the software. For example, the taxonomy may be input by means of an editor program, advantageously including an input mask for elements of text. Advantageously, a graphics editor can be used to create an icon for the taxonomy and all of the drawings enabling the new taxonomy to be displayed and possibly modified at a later date. Links are advantageously established graphically between the elements, the drawings, and the text elements (alphanumeric elements) of the taxonomy.

The study of a new taxonomy passes via the following steps:

identification of the type of garment;

collecting all of the measurements required for grading this type of garment;

identifying the pieces of this type of garment;

on each piece for this type of garment, identifying the measurements concerned, and where they pass through the absolute points;

identifying on each piece the percentage proportion of the interval between two sizes of each measurement, which proportion is the change to which the piece should be subjected to go from one size to the next;

verification of consistency within the entire garment type, for each measurement, that the set of interval proportions for each measurement applied to the various pieces relates to 100% of the interval; and recording the taxonomy in the mass memory.

Also, it is possible to modify an existing taxonomy. This operation is advantageously made available to the user and it does not require any computer knowledge.

Figure 6:
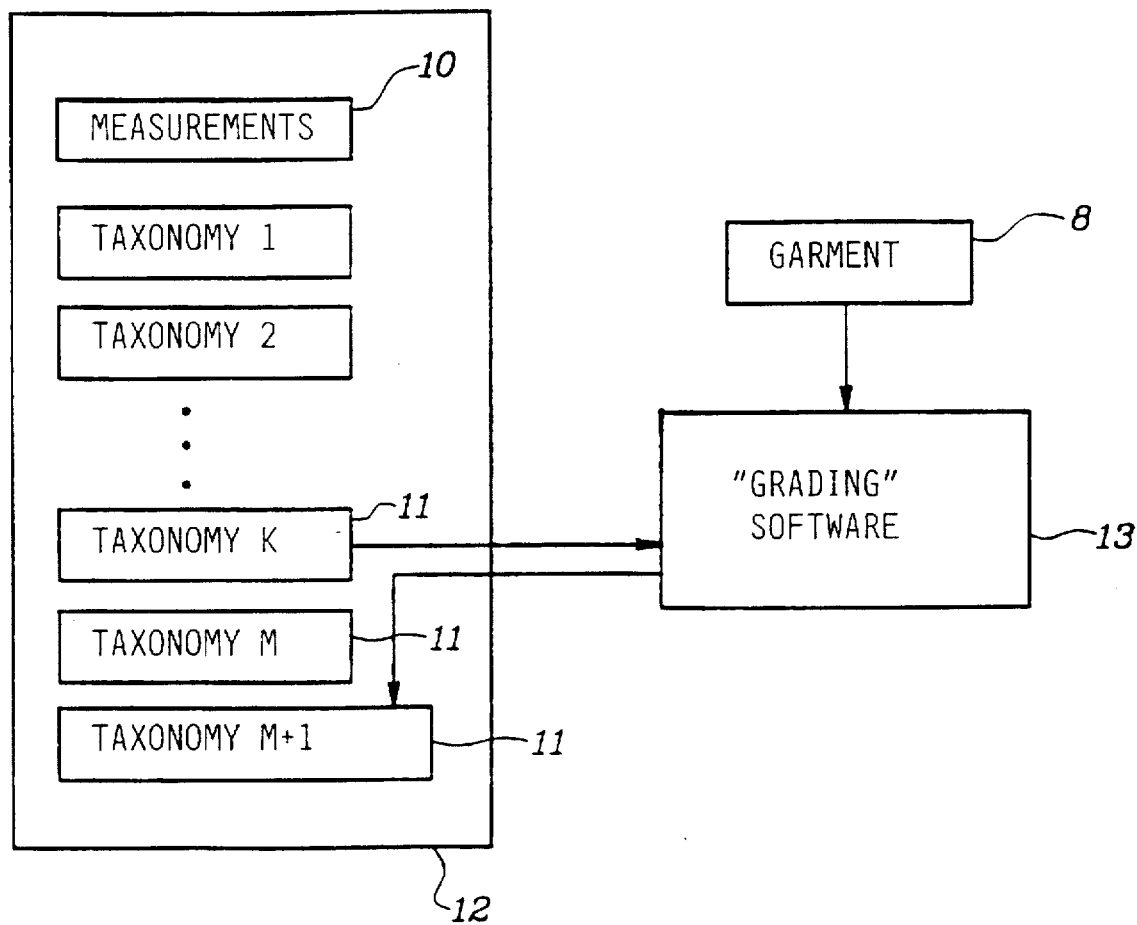
FIG. 6 is a block diagram showing how the database of the present invention is enriched.

For example, it is possible to modify a taxonomy for a similar garment that is ready for use and in which parameters are modified or added so as to create a new garment or a new style of garment. In the example of FIG. 6, taxonomy number K is modified to create taxonomy number M+1. Using a text editor, a dialog box, and/or graphical means, the text editor modifies elements of the taxonomy. The new taxonomy may be given a new name, and, for example, the distribution of variation between sizes for the various pieces of the garment may be changed.

Similarly, a taxonomy is created for check jackets for women by enriching a taxonomy for jackets for women, in such a manner that grading provides garment sizes in which each piece is cut, whenever possible, solely along lines between squares.

In a variant, the final user may create new taxonomies by modifying the distributions of measurement intervals over the various pieces of a standard garment, with this being done by changing the percentage value of the interval applied to a piece of the garment (measurement increment applied to the piece).

The resulting new taxonomy has the same structure as the base taxonomy. Only the percentage distributions of the intervals in the measurements for pieces of the garment that could have been spoilt.

This limits the possibility of creating taxonomies that would lead to grading of poor quality.

Figure 7:
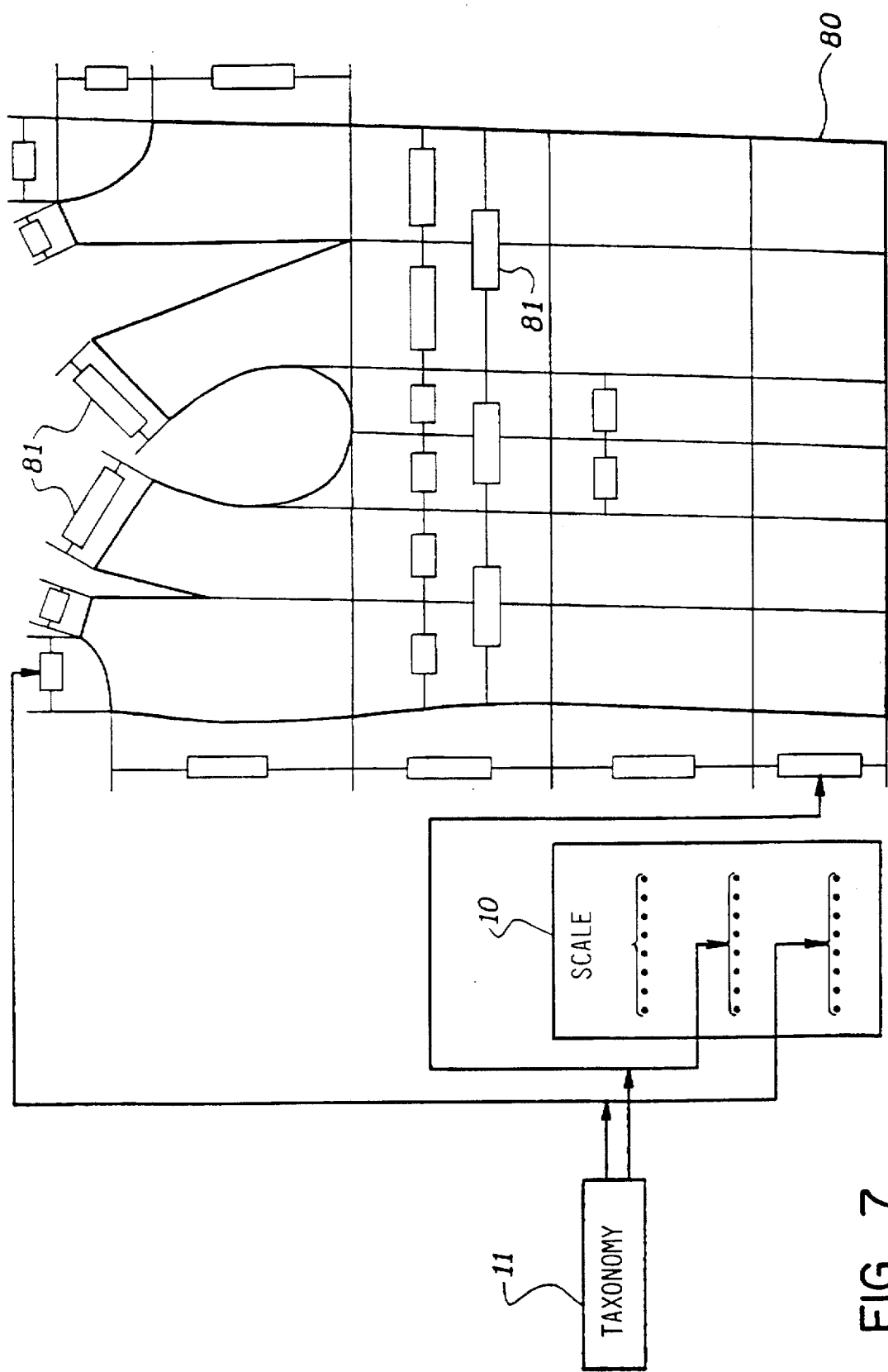
FIG. 7 is a diagram explaining taxonomy in the present invention.

An advantageous graphics display of a taxonomy 11 is given in FIG. 7 which applies to a piece 80 of a standard garment. Rectangles 81 show variations in the various dimensions as a function of size depending on the values in the scale for the garment 10. The taxonomy 11 ensures that these variations are distributed over the various characteristic points of the garment.

To modify a taxonomy, the grader selects one of the rectangles 81 that is to be modified and informs the computer system of the new percentage to be given in variation of the dimensions (a function of size) at this location on the piece 80. This information may be input via the keyboard, for example, or it may be input by means of a pointer device, e.g. a graphics tablet or a mouse.

The grader can assess the result of modifying the taxonomy in this way by means of an appropriate display. The display of FIG. 7 is also advantageously used by the grader to select which taxonomy should be used for grading a garment.

Figure 5:
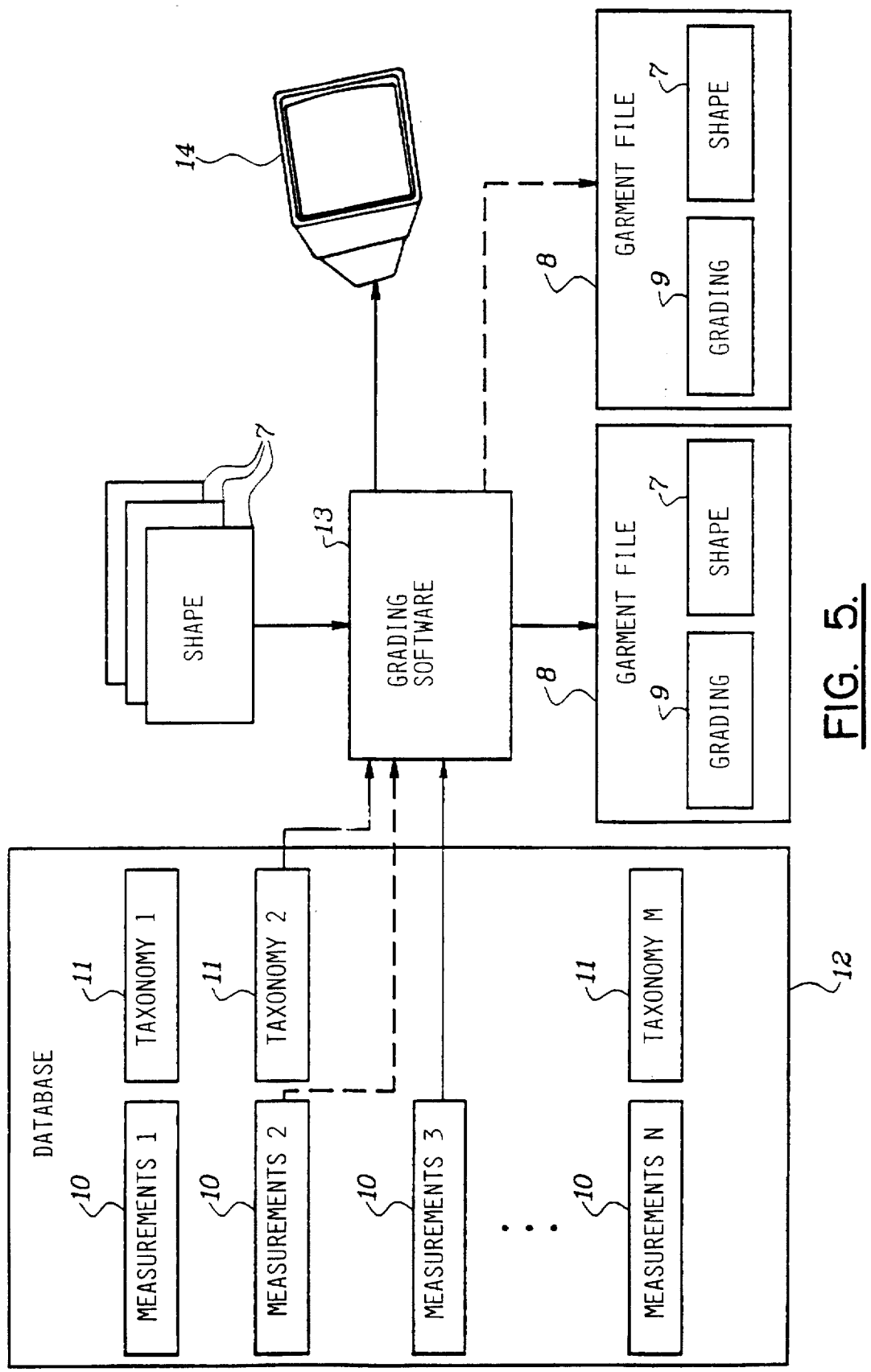
FIG. 5 is a more detailed block diagram of a system of the present invention.

Advantageously, and as shown in FIG. 5, the computer system of the present invention is delivered to the customer with taxonomies 11 for common garments in the sector or sectors of activity that are of interest to the client. Similarly, one or more scales of measurements 10 are provided with the system. Advantageously, the measurement scales 10 and the taxonomies 11 are grouped together in a database 12. As shown in FIG. 6, the database 12 may naturally be enriched with new taxonomies.

Figure 8:
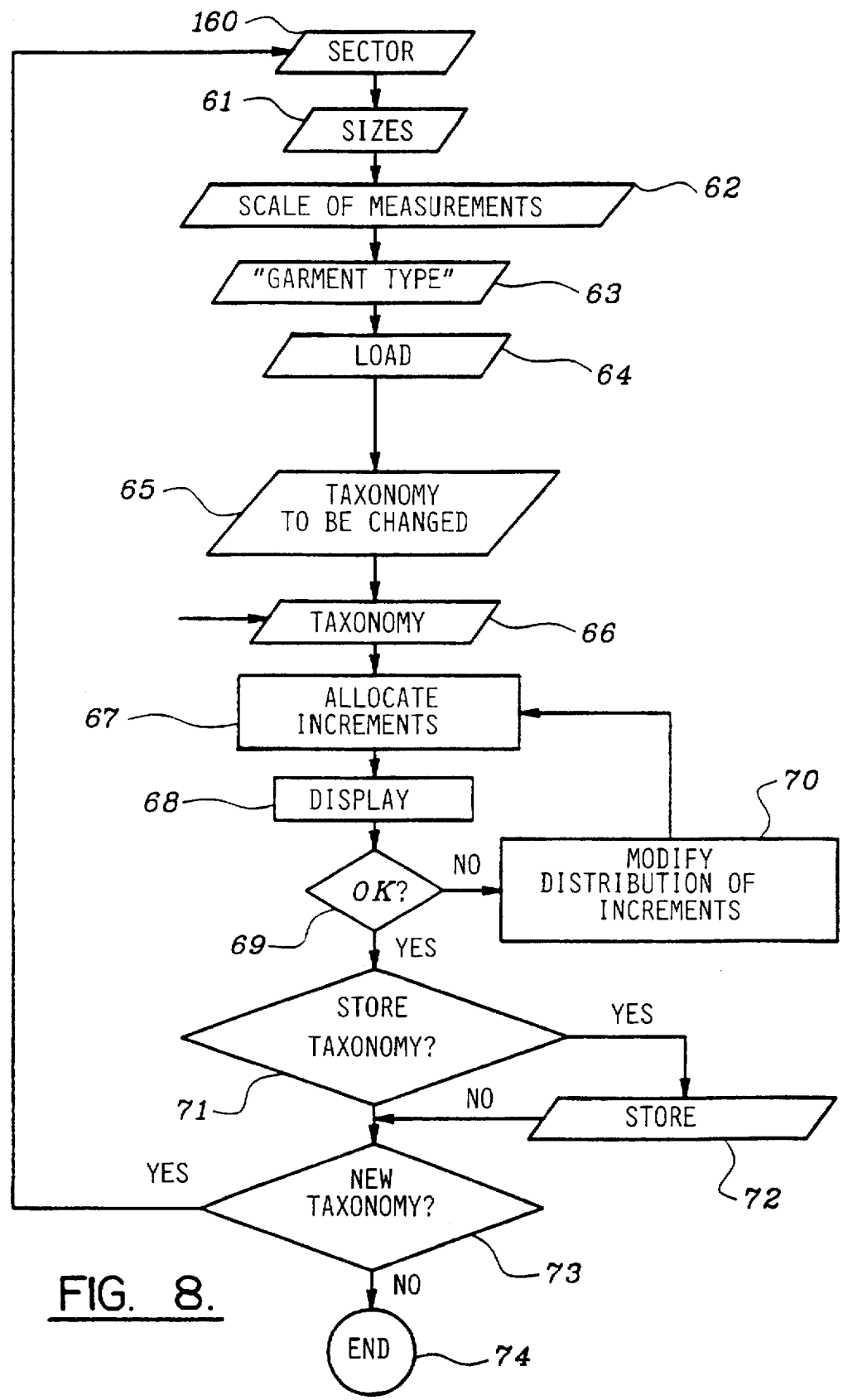
FIG. 8 is a flow chart showing how a new taxonomy is created using a system of the present invention.

In FIG. 8, there can be seen one example of how the database 12 can be enriched with a new taxonomy 11.

At 160, the grader specifies the sectors of activity for the taxonomy.

Move on to 61.

At 61, the grader gives the sizes of the scale to be verified.

Move on to 62.

At 62, the grader selects a measurement scale 10 that is to serve as the basis for creating a new taxonomy.

Figure 11:
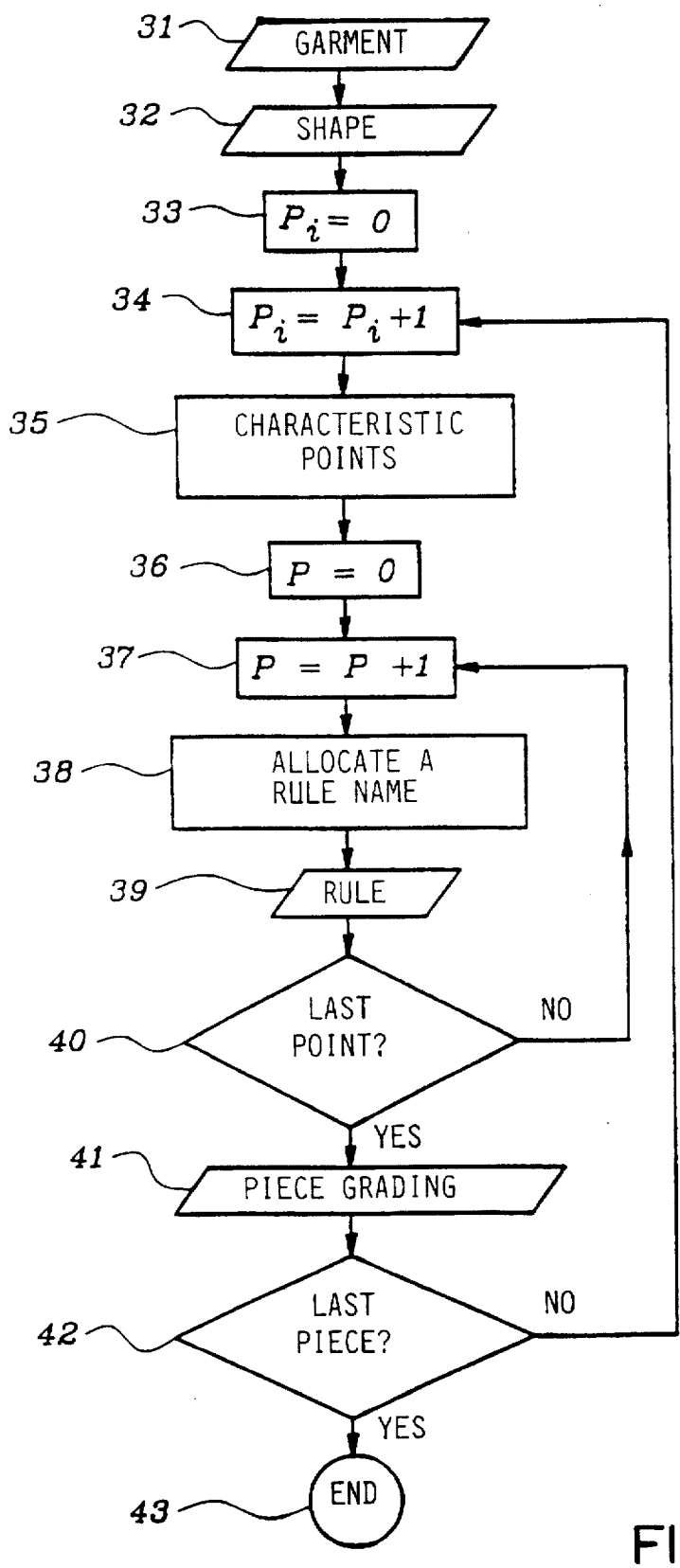
FIG. 11 is a flow chart of an example of a method for allocating grading rules to a piece of a garment.

At 63, the grader selects a garment that is to serve as the basis for creating the new taxonomy. Advantageously, the garment is an ideal garment: an example piece of such an ideal garment is shown in FIG. 11.

Move on to 64.

At 64, the software 13 of the present invention informs the operating system of the graphics station that it seeks to load files describing the various pieces of the ideal garment into central memory from a mass memory and/or a database.

Move on to 65.

At 65, the grader selects a taxonomy 11 to be modified.

Move on to 66.

At 66, the software 13 of the present invention informs the operating system of the graphics station that it desires to load the taxonomy 11 which is to be modified into central memory from the mass memory and/or a database.

Move on to 67.

At 67, the software 13 of the present invention allocates increments on the garment selected with the taxonomy to be modified.

Move on to 68.

At 68, the software 13 of the present invention displays the ideal garment on the monitor 14 for the various sizes, and enriched by the increment values 81, as shown in FIG. 11.

Move on to 69.

At 69, the software 13 of the present invention asks the grader if the new taxonomy is to be validated.

If not, move on to 70.

At 70, the grader modifies the taxonomy, e.g. by modifying the distribution of increments between the various pieces of the garment and between the various characteristic points of the garment. These modifications are communicated to the graphics station via a dialog box, a text editor, or the mouse.

Loop back to 67.

Otherwise, if the answer is yes, move on to 71.

At 71, the software 13 of the present invention asks the grader whether the new taxonomy should be stored.

If the answer is yes, move on to 72.

At 72, the grader gives various items of additional information, in particular the name of the new taxonomy and the associated garment type. The software 13 of the present invention informs the operating system of the graphics station that it desires to save the new taxonomy in central memory and/or in the database 12.

Move on to 73.

If the answer is no, move on to 73.

At 73, the software 13 of the present invention asks the grader whether a new taxonomy is to be created.

If the answer is yes, loop back to 160.

If the answer is no, move on to 74.

At 74, the software 13 of the present invention leaves its module for creating new taxonomies.

Taxonomy processing:

Taxonomies contain a description of relations within a type of garment. A taxonomy contains a list of all of the measurements involved in grading a garment of this type.

It contains a list of the absolute points involved in each piece in association with measurements (position, direction).

For each piece, it contains the proportion (percentage) of the measurement interval between two sizes that is to be applied to the points of the piece.

Taxonomies can be modified, e.g. by varying the percentage distributions of the measurement intervals for the pieces of the garment.

Taxonomy processing and modification may advantageously be performed by an expert system.

Taxonomies may be recorded as independent computer files, as records in a database, or as a set of rules in a rule base and/or facts in a fact base of an expert system. By way of example, a general rule applicable to all taxonomies is of the type:

Rule 1:

For any measurement, the sum of the increments of pieces is equal to 100% of the interval of the corresponding measurement scale.

A rule that is applicable to women and to jackets is:

Rule 2:

Variation in the increment of the front of the garment=– (variation of the increment in the back of the garment).

An example of a rule for a blazer for a man is:

Rule 3:

Variation in front increment=50% of variation in small side increment+50% of variation in back increment.

An example of a taxonomy rule for men's riding jackets is as follows:

Rule 4:

Variation of front increment=variation of back increment; variation of small side increment=0%.

We now describe grading of a garment, e.g. a pair of trousers, as illustrated in FIG. 5. The grader selects the garment to be graded. The grading software 13 loads the central memory of the graphics station via the operating system with the shapes 7 of all of the pieces of the garment to be graded. The grader selects the garment scale 10 that is to be applied, corresponding to the intended population and/or to the garment in question, together with the taxonomy 11 corresponding to trousers. In the example shown in FIG. 5, the grader has selected the number 3 measurement scale 10, and the number 2 taxonomy 11. On the basis of this data, the grading software 12 works out grading 9 for the garment file 8. This step is entirely automatic, insofar as the software computes and/or applies the rules to the various characteristic points, or at least to the absolute points of the pieces of the garment. The rules are applied automatically insofar as the taxonomy 11 includes information concerning the size interval percentages to be given to the various pieces of the garment.

Depending on the intended population, it may be necessary to change the measurement scale 10. For example, the inhabitants of Western Europe, of Eastern countries, or of Asia do not necessarily have the same measurement values. Thus, for a particular market, the grader selects number 2 measurement scale 10 to generate a second garment file 8 corresponding to that particular market.

Advantageously, the software 13 of the present invention includes means for displaying the appearance of the graded garment, e.g. on a cathode ray screen 14. The display may be implemented, for example, before the garment file 8 is generated so that the result can be inspected and, if necessary, grading that does not give complete satisfaction can be rejected.

The software identifies the characteristic points of the garment piece that are to be graded.

Advantageously, this identification is entirely automatic in the taxonomy, and consists in reading the corresponding points. However, the grader giving assistance in choosing the characteristic points for grading does not go beyond the ambit of the present invention.

The method of the invention for automatically identifying characteristic points advantageously depends on the structure and the contents of the file 7 that stores the shape of the garment.

In the most favorable circumstances corresponding to a "base image" file generated by the computer-assisted design stations sold by the Applicant, the files that store the shape include indications about the disposition of the characteristic points of the garment, but without identifying each point by name, and they also include indications on the orientation of each piece. It then suffices to identify on the shape each point from the scale of points contained in the taxonomy 11. Points may be identified by their absolute positions; this is not difficult for points at the corners of a garment piece, e.g. the points W01, W03, W04, W02, A02, and A01 in FIG. 9.

Advantageously, the other points are identified by their relative positions compared with certain already-identified points. Advantageously, the positions of the points identified from the information about relative positions included in the taxonomy 11 is verified for consistency.

For example, the points A03 and A04 are halfway between the points A01 and A02. The side line connects points A03, A04, H03, and H04. The knee line is parallel to the ankle line and lies at a distance that can be deduced from the measurement scale.

When the file 7 storing the shape does not contain an indication about the orientation of the garment pieces, the software of the computer system of the invention begins by identifying the orientations of the garment pieces by using known two-dimensional pattern recognition algorithms, based on the information contained in the taxonomy 11.

The other steps are similar to the preceding method.

In a variant, the taxonomy includes the shapes of the various pieces of the garment to be processed together with indications of the positions of the various characteristic points. The characteristic points of the real garment are identified or determined by geometrically similar grading and/or deformation that ensures that the outlines of the ideal pieces and of the real pieces of the processed document can be superposed. The characteristic points of the ideal pieces are transported onto the real pieces of the garment. I.e. when the file 7 storing the shape contains the positions of the characteristic points, the point on the real garment closes to the corresponding point on the theoretical garment of the taxonomy inherent to all of its properties, and in particular its name.

Figure 10:
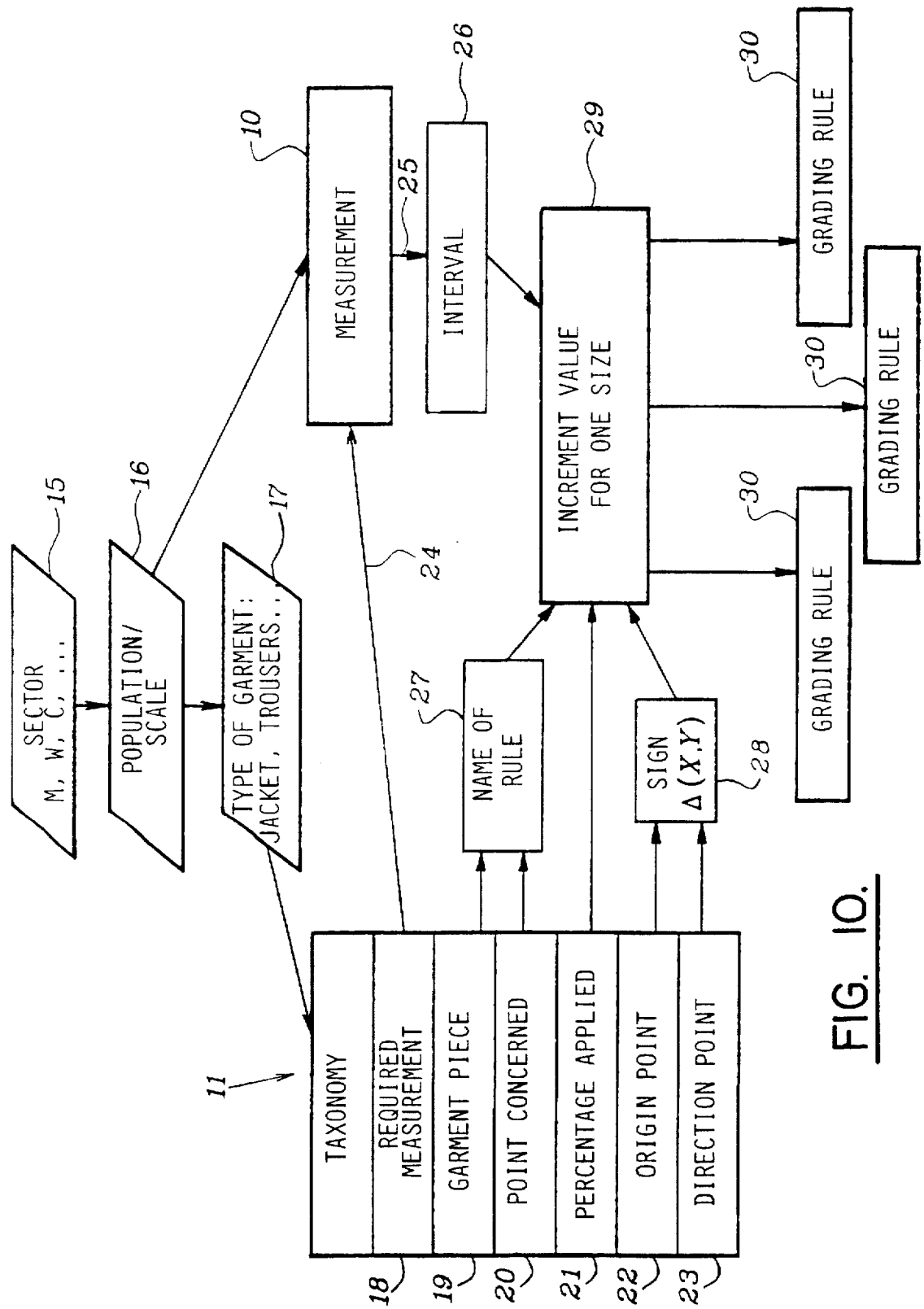
FIG. 10 is a block diagram of the method of the invention for establishing grading rules.

FIG. 10 shows how the system of the present invention is implemented to generate rules applicable to the various absolute points on the various pieces of a garment.

At 15, the grader selects the sector to which the garment to be processed belongs. The sector may comprise, for example, men's clothing, women's clothing, or children's clothing. Naturally the software can be sold in modules and only one sector need be implemented on a workstation. Under such circumstances, the software moves on directly to step 16 during which the grader selects a measurement scale 10 from the database. This scale corresponds to a target population for which it is desired to make up garments that are advantageously optimized (regular intervals). Advantageously, the selected measurement scale is loaded into the central memory of the workstation.

The software moves on to step 17 during which the grader selects the type of garment to be graded, e.g. a jacket or a pair of trousers. The grader's selection causes the taxonomy associated with the selected type of garment to be loaded. In a variant, the grader selects from a plurality of possible taxonomies, e.g. corresponding to various different styles of jacket.

Typically, a taxonomy 11 comprises the following:

the type of garment with which it is associated;

a list 18 of relevant measurements for this type of garment;

a list 19 of pieces of the garment;

a list of characteristic points to be graded for each piece of the garment;

size variation percentages 21 to be allocated to each piece of the garment; and information about the orientation of variation in the dimensions of the garment piece at the point being processed. In the example shown, which corresponds to the taxonomy of Table 7, this information is given by a vector comprising an origin point 22, a direction point 23, and variation signs and projections onto the X and Y axes given at 28.

Column 8 of the taxonomy in Table 7 indicates the direction in which the dimensions vary.

Column 9 of the taxonomy in Table 7 indicates the axis corresponding to variation of dimensions.

Naturally, implementing taxonomies that include a different description for point variation, and in particular a direct indication of the orientation and the direction of the variation for each point, e.g. in Cartesian coordinates or in polar coordinates, does not go beyond the ambit of the present invention.

A taxonomy 11 thus includes information on garment type. This information can equally well be implemented for using data contained in a measurement scale as for making good the absence of certain information in such a scale.

Starting from the relevant measurements 18 of the processed garment, pertinent measurements corresponding to various sizes of the garment are extracted at 24 from the measurement scale 10.

At 25, the interval corresponding to the difference between the processed measurement for two successive sizes is computed. At 29, the value of the increment for a particular size for the point being processed is determined by multiplying the interval computed in 26 by the percentage allocated in 21.

A name 27 is given to the grading rule associated with each point of each piece of the garment. Advantageously, the name 27 of the rule corresponds to the name 20 of the point being processed. In this way, rules can be allocated automatically, as can be seen in FIG. 14.

Increments for a point and for all sizes are computed, thereby enabling the grading rule 30 for the point to be worked out. Thus, the set of grading rules for all of the characteristic points of the garment are worked out.

Naturally, direct computation of grading rules 30 for each point of the garment can be computed directly without computing the value of the increment 29 for each of the points of each size, without going beyond the ambit of the present invention.

In FIG. 11, there can be seen an example of rules being allocated to various points of various pieces of a garment.

At 31, the grader informs the grading system of the present invention of the name of the garment to be graded.

Move on to 32.

At 32, the grading software 12 of the present invention uses the operating system of the graphics station to load the shapes 7 of the various pieces of the garment into central memory.

Move on to 33.

At 33, the piece counter Pi for pieces of the garment to be processed is initialized.

Move on to 34.

At 34, the piece counter for the processed garment is incremented and the shape of the processed piece is loaded.

Move on to 35.

At 35, the software identifies the characteristic points to be graded of the garment piece.

Move on to 36.

At 36, the counter P of points to be graded of the piece to be graded is initialized.

TABLE 7

POPULATION: France SECTOR: Women GARMENT: TYPE Skirt

| Measurement definition | Piece | Measurement | % applied | Abs. point | Abs. point Orgin | Allocated dir. | Sign point | Axis |
|---|---|---|---|---|---|---|---|---|
| waist to middle front | front | waist | 0 | W02 | W02 | W02 | 0 | Y |
| front hip total grad | front | waist | 25 | W02 | W04 | W04 | + | Y |
| front middle hip line | front | hip | 0 | H02 | H02 | H02 | 0 | Y |
| front hip total grad | front | hip | 25 | H02 | H04 | H04 | + | Y |
| back middle waist line | back | waist | 0 | W01 | W01 | W01 | 0 | Y |
| back hip total grad | back | waist | 25 | W01 | W03 | W03 | − | Y |
| back middle hip line | back | hip | 0 | H01 | H01 | H01 | 0 | Y |
| back hip total grad | back | hip | 25 | H01 | H03 | H03 | − | Y |
| front middle hip-waist | front | drop | 100 | H02 | W02 | W02 | + | X |
| front side hip-waist | front | drop | 100 | H04 | W04 | W04 | + | X |
| back middle hip-waist | back | drop | 100 | H01 | W01 | W01 | + | X |
| back side hip-waist | back | drop | 100 | H03 | W03 | W03 | + | X |
| front middle total length | front | waist | 100 | W02 | A02 | A02 | − | X |
| front side total length | front | waist | 100 | W04 | A04 | A04 | − | X |
| back middle total length | back | waist | 100 | W01 | A01 | A01 | − | X |
| back side total length | back | waist | 100 | W03 | A03 | A03 | − | X |

Move on to 37.

At 37, the counter of points to be graded is incremented.

Move on to 38.

At 38, the point to be processed is given the name of the corresponding rule.

In advantageous cases where the points and the corresponding rules have the same names, automatic allocation of rules requires no more than reading and writing. Nevertheless, without going beyond the ambit of the present invention, it is possible for a rule to be allocated by the grader, or for points to be recognized automatically, in particular by analyzing the shape of the piece to be processed and the rules to be allocated thereto.

Move on to 39.

At 39, the software 13 of the present invention uses the operating system of the graphics station to cause the rule allocated to the point being processed to be read from the mass memory and/or the database.

Move on to 40.

At 40, a test is performed to verify whether the last characteristic point of the garment piece has been processed.

If not, loop back to 37.

Otherwise, move on to 41.

At 41, the grading software 13 of the present invention enables the operator to cause the operating system of the graphics station to record the grading of the processed garment piece including the rules for the various characteristic points of the processed piece to be recorded in the garment file 8.

Naturally, implementing step 41 in which rules are allocated after step 39 would not go beyond the ambit of the present invention.

Move on to 42.

At 42, a test is made whether the last piece of the garment has been processed.

If not, loop back to 34.

Otherwise, go to 43.

At 43, the garment has been graded.

A check is performed to verify whether other garments remain to be processed, and if not, this module of the software 13 of the present invention is exited.

Figure 9:
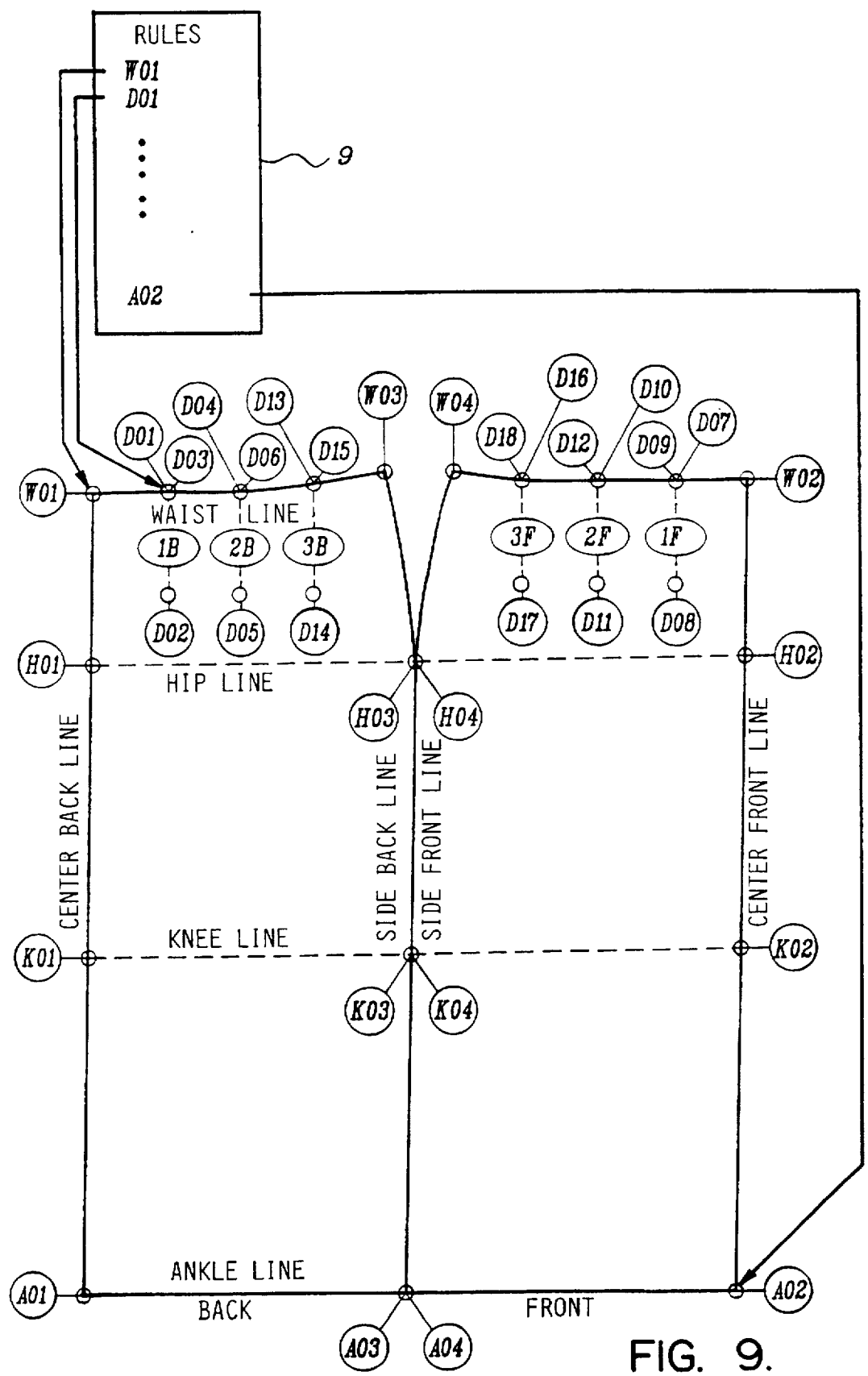
FIG. 9 is a diagram explaining how rules are allocated to various characteristic points of a garment.

In FIG. 9, there can be seen a graphical representation of how rules 9 are allocated to the various absolute points belonging to two pieces of a long skirt. The other side of the skirt is made up of two other pieces (not shown) that are symmetrical.

The system of the invention is equally applicable to dynamic grading with rules being determined directly for each point concerned of the garment and to batch grading comprising a first step of determining which rules should be allocated and a second step of allocating the rules to the point of the garment, preferably automatically. Grading in batches can be quicker insofar as it is possible to reuse previously computed rules over several garments. It gives excellent results whenever the points of the garment are not subject to complex changes.

Dynamic grading gives excellent results in all cases, including those when some of the points of the garment need to be subjected to complex changes, as applies in particular to garments that include darts P. An example of dynamic grading for a garment including darts is given in FIG. 13. In the example shown, the total increment for each graded point is equal to the vector sum of unit increments along the various axes allocated to the processed point.

Figure 13A:
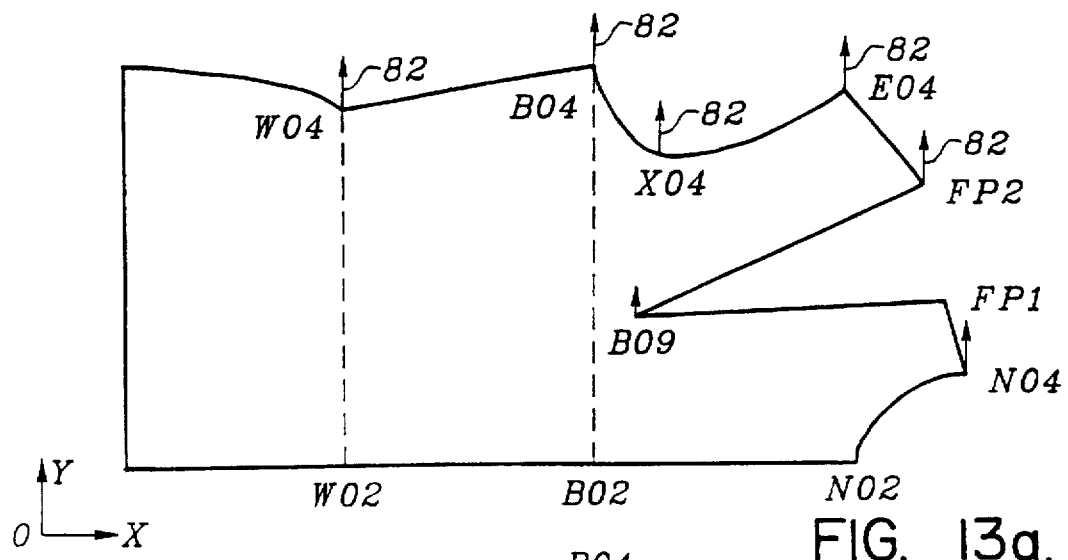
FIG. 13a–13c are diagrams for describing how rules are generated for a garment that includes darts.

In FIG. 13a, width grading is performed by giving increments 82 to the points W04, B04, X04, E04, FP1, FP2, and N04. This grading is performed, in the present invention, by applying the percentage given in the taxonomy for the increment concerned at each point concerned along the Y axis.

Figure 13B:
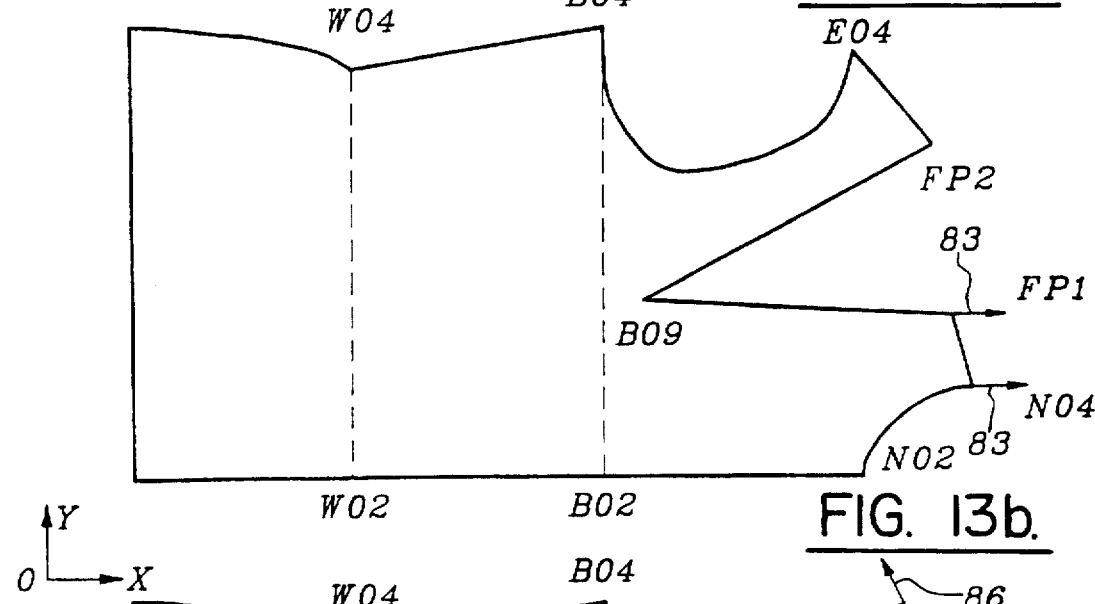

In FIG. 13b, there can be seen length grading along the X axis. Increments 83 have been allocated to points FP1 and N04 corresponding to variation in bust dimensions. This variation is given in a measurement scale 10 by measuring the distance between the seventh cervical vertebra and the waist as measured in the back. The measurement scale 10 may also include a front measurement. Otherwise, the taxonomy explains how this information can be deduced from the information available in the measurement scale 10. For example, for a women's garment, the taxonomy indicates that the increment for the front should be equal to 1.5 times the increment for the back, which is always available in the scale of sizes 10. It can thus be seen that the system of the present invention, using knowledge about the garment as incorporated in the taxonomies makes it possible not only to make better use of the available data, but also to perform grading even when some of the information is not available in the scale of measurements 10.

Insofar as the frame of reference OXY is in rectangular coordinates, grading along the X axis is completely independent from grading along the Y axis. Thus, it would be equally possible to perform the two grading steps, the width step of FIG. 13a and the length step of FIG. 13b in the opposite order.

Figure 13C:
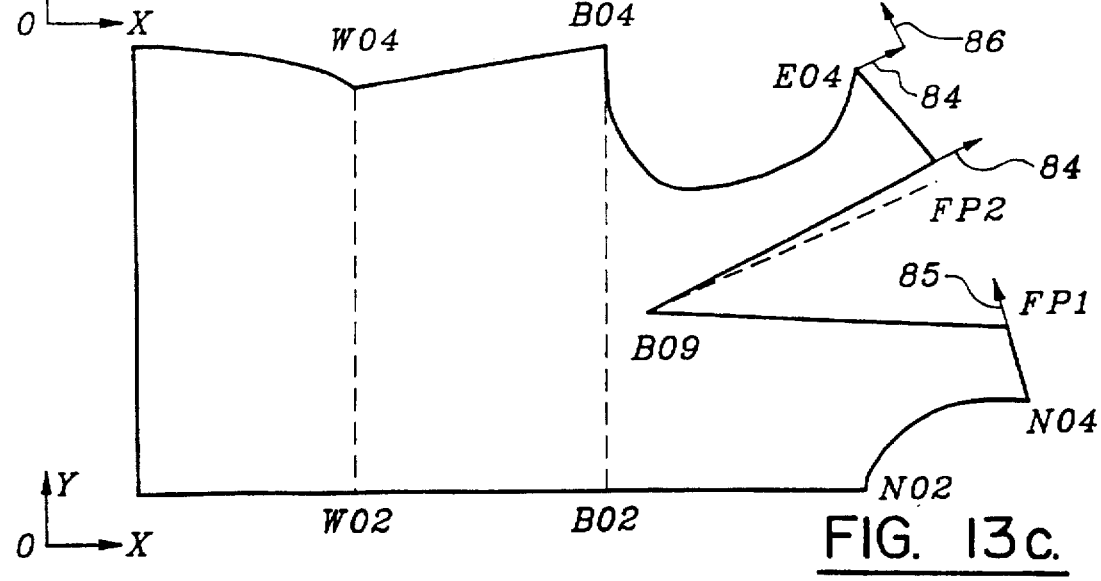

However, it is advantageous to perform grading on other axes such as those shown in FIG. 13c after grading has been performed lengthwise and widthwise. An increment 84 is given to point FP2 which has already been graded in width (increment 82). Thus, the increment 84 is in alignment with the axis B09, FP2 of FIG. 13c which is not identical to the axis B09, FP2 of FIG. 13a as shown in dashed lines in FIG. 13c, and grading of point E04 is subsequently performed parallel to the axis B09, FP2 of FIG. 13c starting from the FIG. 13c position of point E04 (which takes account of increment 82). The presence of the dart P implies that the increase in shoulder width at the point FP1 should be provided along the axis N04, FP1 (increment 85), whereas at FP2 it should be performed along the axis FP2, E04 (increment 86). For example, half of the interval should be allocated to point FP1 while the other half is allocated to point E04.

The orientation of the axis N04, FP1 is not necessarily the same as that shown in FIG. 13b given that the increments 83 received by the points FP1 and N04 are not necessarily the same.

Grading of the remainder of shoulder width (50% in the present case) constitutes increment 86 at point E04 along axis FP2, E04, and taking account of the changes that result from the increments 84.

Naturally, computation can be performed in the reverse order. In which case, the orientation of the increments 84 needs to take account of the modifications provided by increment 86.

The increments that result from this grading may be converted into various different forms of mathematical notation, and in particular they can be projected onto the axes X and Y.

The method shown in FIG. 13 makes it possible to significantly improve the quality of grading by generating grading rules optimized for each point when the two-dimensional surface of the garment changes in complex manner to track changes in the envelope of individuals as a function of size. This gives rise to garments of better quality.

In the preferred example of the system of the present invention, an XY frame of reference is used with axes extending in privileged directions, e.g. with the X axis corresponding to the length of the garment and the Y axis being perpendicular to the X axis. Grading computation is thus simplified for normal changes of the absolute points of a garment with size. In addition, this reproduces the technique adopted in the existing garment CAD system, in particular the garment CAD system sold by the Applicant. Nevertheless, it should be understood that a computer system could be implemented without using privileged axes and without going beyond the ambit of the invention. Under such circumstances, the increments are built up along arbitrary axes by vector addition, taking account of the orientations of the vectors, as shown in FIG. 13c. Under such circumstances, the extra computation can be undertaken by workstations including one or more modern microprocessors having high computing power.

Similarly, grading rules can be determined by the expert system by implementing rules of the following type:

Rule 1

Increment on absolute point=(measuring interval in the scale for the current size)×(% applied to the piece).

Rule 2:

Increment axis=signed direction of (direction point–origin point).

If increment axis=X axis then:

X increment=axis increment and Y increment=0 else:

if increment axis=Y axis then:

Y increment=axis increment and X increment=0.

Rule 3:

If (increment axis not X axis and increment axis not Y axis), then dynamic grading:

find increment axis on the piece in terms of origin absolute point and direction absolute point.

X increment=projection on X axis (increment value along increment axis).

Y increment=projection on Y axis (increment value along increment axis).

Rule 4:

(j=0) is the reference size.

X variation (size i)=sum (j=0 to i) X increment (size j).

Y variation (size i)=sum (j=0 to i) Y increment (size j).

The expert system can be developed in a commercially available artificial intelligence language or advantageously using a system for generating expert systems as is likewise commercially available.

Figure 12:
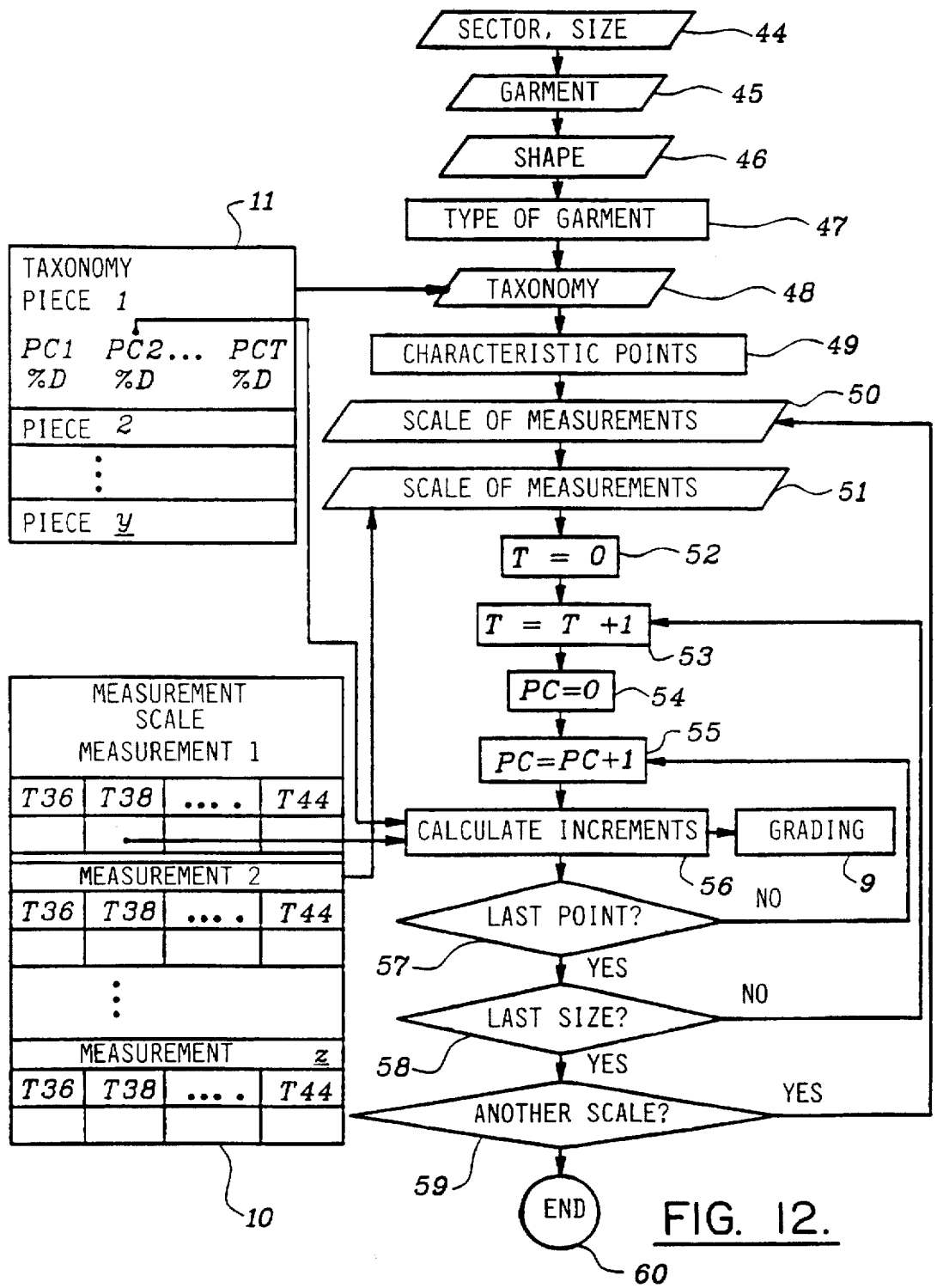
FIG. 12 is a flow chart showing how a garment is graded with a system of the present invention.

In FIG. 12, there can be seen the grading of a garment using a second embodiment of a grading system of the present invention.

At 44, the grader informs the computer system of the sector in which it is to work and the sizes that are to be made.

Move on to 45.

At 45, the grader informs the computer system of the name of the garment to be graded. Advantageously, the grader clicks on the name of a garment file to be graded by using a pointer device, e.g. of the mouse type.

Move on to 46.

At 46, the software 13 of the present invention uses the operating system of the graphics station to load files describing the shape of the various pieces of the garment to be treated into central memory from a mass memory and/or a database.

Move on to 47.

At 47, the software 13 of the present invention uses the operating system of the graphics station to load the taxonomy 11 corresponding to the type of garment to be graded into the central memory from a mass memory and/or a database.

Move on to 48.

At 48, the software 13 of the present invention determines the characteristic points to which respective grading rules are to be allocated, preferably in automatic manner and/or by reading the taxonomy.

Move on to 49.

At 49, the grading software of the present invention determines the characteristic points to which grading rules will need to be applied, advantageously in automatic manner.

Move on to 50.

At 50, the grader tells the grading computer system of the present invention which measurement scale 10 to use.

Move on to 51.

At 51, the software 13 of the present invention uses the operating system of the graphics station to load the selected measurement scale 10 into central memory from a mass memory and/or a database.

Move on to 52.

At 52, the counter of sizes to be graded is initialized.

Move on to 53.

At 53, the counter of graded sizes is incremented.

Move on to 54.

At 54, the counter of characteristic points for the various pieces of the garment to be graded is initialized.

Move on to 55.

At 55, the counter of characteristic points that have been processed is implemented and the taxonomy is searched for information corresponding to the current characteristic point as determined at 48.

Move on to 56.

At 56, the grading software of the present invention computes the increment of the processed point for the processed size. The software 13 of the present invention extracts the measurement corresponding to the processed points for the processed size from the measurement scale 10, e.g. measurement 1 for size "38" in the example shown and also for the adjacent size or the reference size, and it extracts the data to be applied to this point from the taxonomy 11 used, e.g. the interval percentage allocated and the direction in which the dimension of the garment piece is to vary. The software 13 of the present invention computes the increment to be allocated to the point as a function of size, and also possibly the projection thereof on the X and Y axes. Advantageously, the increment computed for the point is stored in the grading 9 of the garment file 8.

Move on to 57.

At 57, a test is made whether the last point of the garment has been treated.

If not, loop back to 55.

Otherwise go on to 58.

At 58, a test is made whether the last size of the grading has been processed.

If not, loop back to 53.

Otherwise go on to 59.

At 59, the software asks the grader whether another measurement scale is to be applied to the garment.

If so, loop back to 50.

Otherwise go on to 60.

At 60, garment grading is terminated.

The grader can grade another garment or can exit the software 13 of the present invention.

The computer system of the present invention is equally capable of grading a garment file entirely automatically and of operating interactively with the grader validating each step. In the first case, the grader inputs or selects the scale to be used, selects the taxonomy to be used and provides the basic shape file to the system. Optionally, the grader enriches the selected scale with constraints that are to be imposed on the garment, e.g. sleeve lengths or jacket lengths for various sizes. Once computation has been performed, the system generates grading for the garment.

Otherwise, an experienced grader can monitor and validate each step of the grading process. Similarly, a less experienced grader can follow the steps that take place during grading for educational and training purposes.

The computer grading system of the present invention is used, for example, in graphics stations for computer-assisted garment design.

I claim:

1. A computer system for grading garments, the system comprising a central unit, display means for displaying information, input/output means for providing information, and memory means for storing an operating system, wherein the memory means additionally store a plurality of measurement scales and at least one relation between the displacements of characteristic points on pieces of a garment and variations in measurements with the size of the garment, together with software for deducing grading rules therefrom and wherein said software applies substantially the same relation between the displacement of characteristic points of pieces of a garment and variations in measurements with size over a plurality of measurement scales so as to deduce therefrom a plurality of gradings for a garment.

2. A computer system for grading garments according to claim 1, including means for applying the grading rules to various points of various pieces of the garment to be graded.

3. A computer system according to claim 2, including means for allocating a rule to each characteristic point of the garment to be graded, which rule has a name which is the same name allocated to said characteristic point.

4. A computer system according to claim 1, wherein the grading software includes means for creating new relations between the displacements of characteristic points of pieces of a garment and variations in measurements with size.

5. A computer system according to claim 1, further comprising a database storing at least one scale of measurements and at least one relation between displacements of characteristic points of the pieces of a garment and variations of the measurements with size.

6. A computer system according to claim 1, wherein the points used as characteristic points for pieces of a garment are points that ought to face measurement points in a measurement table.

7. A computer system according to claim 1, wherein the relations between the displacements of the characteristic points of a piece of a garment and variations in measurements with size of the garment include information concerning size percentage variation to be applied to each characteristic point of each piece of the garment.

8. A computer system according to claim 7, wherein the relations between the characteristic displacements of pieces of a garment and variations in measurement with size of the garment include information concerning the orientation to be given to the displacements of the characteristic points.

9. A computer system according to claim 1, further comprising an interface, including menus for dialog with a grader.

10. A computer system according to claim 9, comprising a menu giving the grader a selection of relations to implement between the displacements of the characteristic points of the pieces of a garment and the variations of measurements with size available in the system.

11. A computer system according to claim 9 comprising a menu giving the grader a selection of measurement scales to implement.

12. A computer system according to claim 1, including means for displaying icons on a graphics screen, means for enabling the operator to point at the various graphics elements displayed, and means for interpreting such pointing as instructions or commands to the computer system.

13. A computer system according to claim 1, including means for graphically displaying the result of grading.

14. A computer system according to claim 1, wherein the central unit is a graphics station for computer-assisted garment design.

15. A computer system according to claim 1, including means for modifying the relations between the displacements of the characteristic points of the garment pieces and the measurement variations with size of the garment for modifying the displacement percentages allocated to the various characteristic points.

16. A computer system according to claim 1, including means for recognizing the locations of various characteristic points on the various pieces of the garment and for allocating corresponding names thereto.

17. A computer system for grading garments according to claim 1, comprising an expert system including a knowledge base in which there are stored relations between the displacements of the characteristic points of the pieces of a garment and variations in measurements with size for the garment.

18. A computer system for grading garments according to claim 1, including an expert system that recognizes the characteristic points of a garment to be graded.

19. A computer system according to claim 18, wherein the expert system includes a base comprising relations between the displacements of the characteristic points of the pieces of a garment and variations of measurements with size of the garment, and in that it deduces therefrom grading rules to be applied to the various characteristic points of the garment to be graded, and in that it applies the grading rules to the recognized characteristic points.

20. A method of grading garments by a computer system comprising the following steps:

a) loading the central memory of the computer with a description of the shapes of the various pieces of a garment to be graded, a plurality of a measurement scale, and a relation between the displacements of the characteristic points of the pieces of the garment to be graded and measurement variations with size of the garment;

b) computing the intervals between the measurements of consecutive sizes for the garment;

c) deducing from the relation between the displacements of the characteristic points of the pieces of a garment and variations in measurements with size and in the measurement scale, grading rules to be applied to the various characteristic points of the various pieces of the garment to be graded;

d) applying the grading rules determined in step c) to the various corresponding characteristic points of the garment;

e) storing and resulting grading in a mass memory or in a database; and f) utilizing the resulting grading stored in the mass memory or database so as to apply substantially the same relation between the displacement of characteristic points of pieces of a garment and variations in measurements with size over a plurality of measurement scales so as to deduce therefrom a plurality of gradings for a garment.

21. A computer system for grading garments, the system comprising a central unit, display means for displaying information, input/output means for providing information, and memory means storing an operating system, wherein the memory wherein means additionally store, at least one measurement scale and at least one relation between the displacements of characteristic points on pieces of a garment and variations in measurements with the size of the garment, and software for deducing grading rules therefrom.

22. A computer system for grading garments according to claim 21, characterized in that it includes means for applying the grading rules to various points of various pieces of the garment to be graded.

23. A computer system according to claim 22, characterized in that it includes means for allocating a rule to each characteristic point of the garment to be graded, which rule has the same name as the name allocated to said characteristic point.

24. A computer system according to claim 21, characterized in that grading software includes means for creating new relations between the displacements of characteristic points of pieces of a garment and variations in measurements with size.

25. A computer system according to claim 21, characterized in that it includes a database storing at least one scale of measurements and at least one relation between displacements of characteristic points of the pieces of a garment and variations of the measurements with size.

26. A computer system according to claim 21, characterized in that the points used as characteristic points for pieces of a garment are points that ought to face measurement points in a measurement table.

27. A computer system according to claim 21, characterized in that the relations between the displacements of the characteristic points of a piece of a garment and variations in measurements with size of the garment include information concerning size percentage variation to be applied to each characteristic point of each piece of the garment.

28. A computer system according to claim 27, characterized in that the relations between the characteristic displacements of pieces of a garment and variations in measurement with size of the garment include information concerning the orientation to be given to the displacements of the characteristic points.

29. A computer system according to claim 21, characterized in that it includes an interface including menus for dialog with a grader.

30. A computer system according to claim 29, characterized in that it includes a menu giving the grader a selection of relations to implement between the displacements of the characteristic points of the pieces of a garment and the variations of measurements with size available in the system.

31. A computer system according to claim 29, characterized in that it includes a menu giving the grader a selection of measurement scales to implement.

32. A computer system according to claim 21, characterized in that it includes means for displaying icons on a graphics screen representing data, means enabling the operator to point at the various graphics elements displayed, and means for interpreting such pointing as instructions or commands to the computer system.

33. A computer system according to claim 21, characterized in that it includes means for graphically displaying the result of grading.

34. A computer system according to claim 21, characterized in that the central unit is a graphics station for computer-assisted garment design.

35. A computer system according to claim 21, characterized in that it includes means for modifying the relations between the displacements of the characteristic points of the garment pieces and the measurement variations with size of the garment, in particular for modifying the displacement percentages allocated to the various characteristic points.

36. A computer system according to claim 21, characterized in that it includes means, in particular an expert system, for recognizing the locations of various characteristic points on the various pieces of the garment and for allocating corresponding names thereto.

37. A computer system for grading garments according to claim 21, characterized in that it includes an expert system including a knowledge base in which there are stored relations between the displacements of the characteristic points of the pieces of a garment and variations in measurements with size for the garment.

38. A computer system for grading garments according to claim 21, characterized in that it includes an expert system that recognizes the characteristic points of a garment to be graded.

39. A computer system according to claim 38, characterized in that the expert system includes a base comprising relations between the displacements of the characteristic points of the pieces of a garment and variations of measurements with size of the garment, and in that it deduces therefrom grading rules to be applied to the various characteristic points of the garment to be graded, and in that it applies the grading rules to the recognized characteristic points.

40. A computer system for grading garments, the system comprising a central unit, display means for displaying information, input/output means for providing information, and memory means storing an operating system, wherein the memory means additionally store, at least one measurement scale and at least one relation between the displacements of characteristic points on pieces of a garment and variations in measurements with the size of the garment, software for deducing grading rules therefrom, and means for modifying said at least one measurement scale so as to distribute variations in at least one measurement uniformly over consecutive sizes.

41. A computer system for grading garments, the system comprising a central unit, display means for displaying information, input/output means for providing information, and memory means storing an operating system, wherein the memory means additionally store, at least one measurement scale and at least one relation between the displacements of characteristic points on pieces of a garment and variations in measurements with the size of the garment, and software for deducing grading rules therefrom, wherein the storage means store tolerances that are acceptable when modifying the measurement scale and includes means for preventing any modification that lies outside said acceptable tolerances.

42. A computer system for grading garments, the system comprising a central unit, display means for displaying information, input/output means for providing information, and memory means storing an operating system, wherein the memory means additionally store, at least one measurement scale and at least one relation between the displacements of characteristic points on pieces of a garment and variations in measurements with the size of the garment, software for deducing grading rules therefrom, and means for working out grading rules directly on the pieces of a garment wherein a characteristic point of one piece of the garment may be subjected to a plurality of displacements and wherein said system includes means for determining the displacement that is the resultant of said plurality of displacements.

43. A computer system for grading garments, the system comprising a central unit, display means for displaying information, input/output means for providing information, and memory means storing an operating system, wherein the memory means additionally store, at least one measurement scale and at least one relation between the displacements of characteristic points on pieces of a garment and variations in measurements with the size of the garment, software for deducing grading rules therefrom, an expert system for ensuring a uniform distribution of the intervals between the various sizes in a scale, wherein the expert system proposes to the grader an optimum scale that has been made uniform.

44. A computer system for grading garments, the system comprising a central unit, display means for displaying information, input/output means for providing information, and memory means storing an operating system, wherein the memory means additionally store, at least one measurement scale and at least one relation between the displacements of characteristic points on pieces of a garment and variations in measurements with the size of the garment, and an expert system software for deducing grading rules therefrom, wherein when the scale to be used for grading does not include certain relevant measurements, the expert system determines them on the basis of other measurements available in the same scale.

45. A method of grading garments by implementing a computer system comprising the steps of:
   a) loading the central memory of the computer with a description of the shapes of the various pieces of a garment to be graded, a measurement scale, and a relation between the displacements of the characteristic points of the pieces of the garment to be graded and measurement variations with size of the garment;
   b) computing the intervals between the measurements of consecutive sizes for the garment;
   c) deducing from the relation between the displacements of the characteristic points of the pieces of a garment and variations in measurements with size and in the measurement scale, grading rules to be applied to the various characteristic points of the various pieces of the garment to be graded;
   d) applying the grading rules determined in step c) to the various corresponding characteristic points of the garment; and
   e) storing the resulting grading in a mass memory or in a database.

46. A computer system for grading garments, the system comprising a central unit, display means for displaying information, input/output means for providing information, memory means storing an operating system wherein the memory means additionally store at least one measurement scale and at least one relation between the displacements of characteristic points on pieces of a garment and variations in measurements with the size of the garment, software for deducing grading rules therefrom and means for modifying a measurement scale in such a manner as to distribute variations in at least one measurement uniformly at least over a range of sizes covering at least three consecutive sizes.

47. A computer system for grading garments, the system comprising a central unit, display means for displaying information, input/output means for providing information, memory means storing an operating system wherein the memory means additionally store at least one measurement scale and at least one relation between the displacements of characteristic points on pieces of a garment, and variations in measurements with the size of the garment, said memory means also storing tolerances that are acceptable when modifying the measurement scale and in that it includes means for preventing any modification that lies outside said acceptable tolerances and software for deducing grading rules therefrom.

48. A computer system for grading garments, the system comprising a central unit, display means for displaying information, input/output means for providing information, and memory means storing an operating system, wherein the memory means additionally store, at least one measurement scale and at least one relation between the displacements of characteristic points on pieces of a garment and variations in measurements with the size of the garment, and software for deducing grading rules therefrom and means for working out grading rules directly on the pieces of a garment, in that a characteristic point of one piece of the garment may be subjected to a plurality of displacements, and in that it includes means for determining the displacement that is the resultant of said plurality of displacements.

49. A computer system for grading garments, the system comprising a central unit, display means for displaying information, input/output means for providing information, and memory means storing an operating system, wherein the memory means additionally store, at least one measurement scale and at least one relation between the displacements of characteristic points on pieces of a garment and variations in measurements with the size of the garment, software for deducing grading rules therefrom and an expert system for ensuring a uniform distribution of the intervals between the various sizes in a scale, and in that the expert system proposes to the grader an optimum scale that has been made uniform.

50. A computer system for grading garments, the system comprising a central unit, display means for displaying information, input/output means for providing information, and memory means storing an operating system, wherein the memory means additionally store, at least one measurement scale and at least one relation between the displacements of characteristic points on pieces of a garment and variations in measurements with the size of the garment, and software for deducing grading rules therefrom, and an expert system including a knowledge base in which there are stored relations between the displacements of the characteristic points of the pieces of a garment and variations in measurements with size for the garment wherein when the scale to be used for grading does not include certain relevant measurements, the expert system determines them on the basis of other measurements available in the same scale.

* * * * *